(12) United States Patent
Dugat

(10) Patent No.: US 9,926,094 B2
(45) Date of Patent: Mar. 27, 2018

(54) PHOTONIC BOX OPENING SYSTEM

(71) Applicant: Robotica, Inc., Spring, TX (US)

(72) Inventor: Jay Mark Dugat, Spring, TX (US)

(73) Assignee: Robotica, Inc., Spring, TX (US)

(*) Notice: Subject to any disclaimer, the term of this patent is extended or adjusted under 35 U.S.C. 154(b) by 74 days.

(21) Appl. No.: 14/775,612

(22) PCT Filed: Mar. 12, 2014

(86) PCT No.: PCT/US2014/025076
§ 371 (c)(1),
(2) Date: Sep. 11, 2015

(87) PCT Pub. No.: WO2014/165281
PCT Pub. Date: Oct. 9, 2014

(65) Prior Publication Data
US 2016/0016684 A1    Jan. 21, 2016

Related U.S. Application Data

(60) Provisional application No. 61/778,202, filed on Mar. 12, 2013.

(51) Int. Cl.
| | |
|---|---|
| *B65B 69/00* | (2006.01) |
| *B65B 57/02* | (2006.01) |
| *B65B 59/02* | (2006.01) |
| *B23K 26/03* | (2006.01) |
| *B23K 26/08* | (2014.01) |

(Continued)

(52) U.S. Cl.
CPC .......... *B65B 69/0033* (2013.01); *B23K 26/03* (2013.01); *B23K 26/082* (2015.10); *B23K 26/0838* (2013.01); *B23K 26/127* (2013.01); *B23K 26/38* (2013.01); *B23K 26/402* (2013.01); *B26D 3/12* (2013.01); *B26D 5/08* (2013.01); *B26D 7/0625* (2013.01); *B65B 57/02* (2013.01);
(Continued)

(58) Field of Classification Search
USPC .............. 219/121.83, 121.67–121.72; 83/80
See application file for complete search history.

(56) References Cited

U.S. PATENT DOCUMENTS

| | | |
|---|---|---|
| 1,603,633 A | 8/1924 | Nelson |
| 1,737,762 A | 12/1929 | Howe |

(Continued)

OTHER PUBLICATIONS

PCT/US2014/025098 International Search Report and Written Opinion dated Sep. 15, 2014, 11 pages.
(Continued)

*Primary Examiner* — Samuel M Heinrich
(74) *Attorney, Agent, or Firm* — JL Salazar Law Firm

(57) ABSTRACT

The following simplified summary is provided in order to provide a basic understanding of some aspects of the claimed subject matter. Its purpose is to present some concepts in a simplified form as a prelude to the more detailed description that is presented later. In certain embodiments a system for opening packages is provided comprising a conveyer for supporting or conveying a package, wherein the package comprises a surface material and a measurement zone wherein the package is inspected and measured for a cutting operation to thereby determine a process location comprising a location on the package for introduction of a cut to the surface material.

62 Claims, 26 Drawing Sheets

(51) Int. Cl.
  *B23K 26/12*   (2014.01)
  *B23K 26/38*   (2014.01)
  *B23K 26/40*   (2014.01)
  *B23K 26/082*  (2014.01)
  *B23K 26/402*  (2014.01)
  *B26D 3/12*   (2006.01)
  *B26D 5/08*   (2006.01)
  *B26D 7/06*   (2006.01)
  *B23K 101/04*  (2006.01)
  *B23K 103/00*  (2006.01)

(52) U.S. Cl.
  CPC .......... *B65B 59/02* (2013.01); *B23K 2201/04* (2013.01); *B23K 2203/40* (2015.10)

(56) References Cited

U.S. PATENT DOCUMENTS

| | | |
|---|---|---|
| 2,993,583 A | 6/1958 | Sykes |
| 3,137,068 A | 6/1964 | Quigley |
| 3,232,409 A | 2/1966 | Pierson et al. |
| 3,944,054 A | 3/1976 | Ensinger |
| 4,014,428 A | 3/1977 | Ossbahr |
| 4,192,496 A | 3/1980 | Baselice |
| 4,200,178 A | 4/1980 | Gunti |
| 4,256,213 A | 3/1981 | Shaw et al. |
| 4,269,302 A | 5/1981 | Garvey |
| 4,653,961 A | 3/1987 | Hashimoto |
| 4,715,488 A | 12/1987 | Hewitt |
| 4,730,718 A | 3/1988 | Fazio |
| 4,804,081 A | 2/1989 | Lenhardt |
| 4,962,841 A | 10/1990 | Kloosterhouse et al. |
| 5,101,703 A | 4/1992 | Tanaka et al. |
| 5,165,516 A | 11/1992 | Reed |
| 5,172,804 A | 12/1992 | Chersin |
| 5,217,110 A | 6/1993 | Spangler et al. |
| 5,351,809 A | 10/1994 | Gilmore |
| 5,568,857 A | 10/1996 | Chen |
| 5,699,892 A | 12/1997 | Shyr et al. |
| 5,718,325 A | 2/1998 | Doster |
| 5,854,460 A | 12/1998 | Graf et al. |
| 5,911,300 A | 6/1999 | Mraz |
| 5,971,132 A | 10/1999 | Bonnet |
| 5,984,078 A | 11/1999 | Bonnet |
| 6,068,111 A | 5/2000 | Smith |
| 6,073,747 A | 6/2000 | Takino |
| 6,227,377 B1 | 5/2001 | Bonnet |
| 6,471,031 B1 | 10/2002 | Duncalf |
| 6,533,096 B2 | 3/2003 | Gilmore |
| 6,629,018 B2 | 9/2003 | Mondie |
| 6,719,119 B1 | 4/2004 | Hendzel |
| 6,782,993 B2 | 8/2004 | Bernard et al. |
| 6,843,365 B2 | 1/2005 | Baker |
| 6,907,978 B2 | 6/2005 | Evans |
| 6,957,736 B2 | 10/2005 | Bonifer et al. |
| 7,150,383 B2 | 12/2006 | Talken |
| 7,261,198 B2 | 8/2007 | Tatar |
| 7,638,729 B2 | 12/2009 | Park |
| 7,641,043 B2 | 1/2010 | Vestergaard |
| 7,720,567 B2 | 5/2010 | Doke et al. |
| 7,909,153 B2 | 3/2011 | Pogue |
| 8,161,854 B2 | 4/2012 | Fourney |
| 8,561,790 B2 | 10/2013 | Brayman |
| 8,684,169 B2 | 4/2014 | Itoh |
| 8,827,623 B2 | 9/2014 | Stelter |
| 9,110,773 B2 | 8/2015 | Roush |
| 9,216,862 B2 | 12/2015 | Wallace |
| 9,475,653 B2 | 10/2016 | Dugat |
| 2001/0003939 A1 | 6/2001 | Lui et al. |
| 2004/0211651 A1 | 10/2004 | Hall |
| 2004/0226803 A1 | 11/2004 | Brixius et al. |
| 2007/0125212 A1 | 6/2007 | Hilgendorf |
| 2007/0221471 A1 | 9/2007 | Fourney |
| 2008/0169171 A1 | 7/2008 | Itoh |
| 2009/0065327 A1 | 3/2009 | Evangelista |
| 2009/0113853 A1 | 5/2009 | Porter et al. |
| 2010/0272961 A1 | 10/2010 | Costin, Jr. |
| 2014/0290827 A1* | 10/2014 | Heeman ............... B65C 3/065 156/64 |
| 2014/0346008 A1 | 11/2014 | Hoynash |
| 2015/0144536 A1 | 5/2015 | Dugat |
| 2016/0031580 A1 | 2/2016 | Dugat |
| 2017/0008706 A1 | 1/2017 | Dugat |
| 2017/0057756 A1 | 3/2017 | Dugat |

OTHER PUBLICATIONS

PCT/US2014/025098 International Preliminary Report on Patentability dated Sep. 24, 2015, 9 pages.
PCT/US2014/025076 International Search Report and Written Opinion dated Jul. 8, 2014, 12 pages.
PCT/US2014/025076 International Preliminary Report on Patentability dated Sep. 24, 2015, 11 pages.
CN102079407A published Jun. 1, 2011, Abstract and machine translation from ISA/US for PCT/US2014/025076 International Search Report, 4 pages.
News Track Converyor Units Brochure, Mar. 2013, 2 pages.

* cited by examiner 2D image processed data of top surface

3D LASER scan of top surface 3D 2D LASER data combined

Actual 3D cut path as compared to
original die lines of the box

Tape section being cut with CO2 LASER

PHOTONIC BOX OPENING SYSTEM

CROSS-REFERENCE TO RELATED APPLICATIONS

This application is a 371 (national phase) application of PCT Application No. PCT/US2014/025076 filed on Mar. 12, 2014, which claims the benefit of U.S. Provisional Patent Application No. 61/778,202, filed on 12 Mar. 2013, the entire contents of which are hereby incorporated by reference.

FIELD

The present invention relates to automated systems and methods of evaluating and opening packages.

BACKGROUND

Manual box opening or box cutting remains the most prevalent method of opening boxes. It is estimated that multiple billions of boxes are opened each year in various commercial processes. This demand has prompted the design and sale of box opening or cutting machines. Generally, however, these machines utilize blade-based cutting techniques. These techniques suffer from a variety of drawbacks. The presently described systems and methods overcome these drawbacks and address a variety of needs in the art.

SUMMARY

The following simplified summary is provided in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In certain embodiments a system for opening packages is provided comprising (a) a conveyer for supporting or conveying a package, wherein the package comprises a surface material; (b) a measurement zone wherein the package is inspected and measured for a cutting operation to thereby determine a process location comprising a location on the package for introduction of a cut to the surface material; and (c) a cutting zone comprising a photonic energy beam source, wherein the photonic energy beam source emits an energy beam directed at the process location, and wherein the energy beam contacts and cuts the surface material in the process location. In certain embodiments the system further comprises a beam trap that is configured to trap light energy from the energy beam inside the system. Often, the beam trap comprises an actuated door and a conveyor. Also frequently, the beam trap comprises two actuated doors and a conveyor. Often, the two actuated doors are interlocked such that both doors cannot be open concurrently when the system is in use. In certain embodiments a 90-degree transfer conveyor is utilized in the beam trap.

In particular embodiments, the photonic energy beam source is mounted on a gantry. Often the photonic energy beam source is moveable in X-, Y-, and/or Z-directions. In certain embodiments the photonic energy beam source is omni-directional. Also the system may further comprise a mirror configured to split the photonic energy beam into multiple beams, each of which is capable of cutting the surface material and is directed at the same or different process location. Often, the mirror is not stationary and is configured to move to re-direct or focus one or more of the multiple beams. In certain embodiments, the system comprises a mirror configured to re-direct or focus the photonic energy beam. Often such a mirror is non-stationary.

In certain embodiments the photonic energy beam source is configured to impart a cut in a portion of the surface material at multiple angles or at different locations of the surface material or the packaging material. Most frequently, the photonic energy beam source comprises a laser.

In certain embodiments, the package comprises a damaged portion in the surface material, wherein the damaged portion comprises an irregularity not present on an undamaged package of the same type. Systems of the present disclosure are frequently configured to control the depth of the cut in the surface material using a focal length adjustment, dwell time adjustment, or an interferometer. Often, the measurement zone and the cutting zone comprise the same spatial area in the system.

In certain preferred embodiments the system is configured to inspect or measure the package and/or cut the surface material of the package while the package is in-motion on the conveyor. Often the system comprises a feedback encoder or an optical feedback mechanism to provide information about a location of the package on the conveyor.

In certain embodiments the process location identified or adjusted using a displacement sensor.

Often the, wherein the measurement zone of the system comprises a 3D scanning mechanism. Also often, the 3D scanning mechanism comprises an X-axis, a Y-Axis, and a Z-axis scanner. Frequently, the 3D scanning mechanism is configured to provide a three dimensional map of each package, and wherein the process location is determined based on the three dimensional map. In frequent embodiments the measurement zone comprises a 2D scanning mechanism and a 3D scanning mechanism.

The present disclosure also provides a system for opening packages, comprising: (a) a conveyer for supporting or conveying a package, wherein the package comprises a surface material; (b) a measurement zone wherein the package is inspected and measured for a cutting operation to thereby determine a process location comprising a location on the package for introduction of a cut to the surface material; and (c) a cutting zone comprising a photonic energy beam source, wherein the photonic energy beam source emits an energy beam directed at the process location, and wherein the energy beam contacts and cuts the surface material in the process location, and wherein the package is not restrained or clamped within the system when the surface material is cut.

Methods of opening a package are also provided, comprising presenting a package to the system of claim 1, inspecting and measuring the package, and cutting the surface material of the package, thereby opening the package. Methods are also provided comprising presenting a package to the system of claim X, inspecting and measuring the package, and cutting the surface material of the package while not restraining or clamping the package, thereby opening the package. The present methods include, for example, inspecting and measuring the package, and cutting the package steps are carried out in relation to a first and second package, wherein the first and second packages each comprise different physical dimensions and/or comprising different surface materials.

In the present methods, most frequently there is no human intervention within the system between carrying out the inspecting and measuring step, and cutting step in relation to both of the first and second packages. In these methods the surface material of the package is often cut while the package is in motion. Moreover, the motion of the package is often imparted by the action of the conveyor.

Also provided are methods of opening a package, comprising: (a) measuring or inspecting a package comprising a surface material to thereby determine a process location comprising a location on the package for introducing a cut to the surface material; and (b) after or concurrent with step (a), directing a photonic energy beam at the processing location and thereby cutting the surface material of the package. Frequently, steps (a) and (b) occur automatically without human intervention. Often a depth of the cut is controlled using a focal length adjustment, dwell time adjustment, or using an interferometer. In certain methods, steps (a) and (b) are carried out in relation to two different packages, each having different physical characteristics and/or surface materials. According to frequent methods of the present disclosure, steps (a) and (b) are carried out on a continuous basis in relation to multiple packages without human intervention. Often the two or more of the multiple packages comprise packages having different physical dimensions and/or comprising different surface materials. In certain methods step (a) comprises obtaining a 3D scan or map of the package. The process location is frequently determined based on this 3D scan or map of the package or using a 2D scan as well. Also often, step (a) comprises obtaining a 2D and a 3D scan or map of the package.

Frequently, the photonic energy beam vaporizes a portion of the surface material.

In certain methods, the package passes through a beam trap that is configured to trap light energy from the energy beam inside the system prior to or after step (a) or (b). Often the beam trap comprises an actuated door and a conveyor. Also frequently, the beam trap comprises two actuated doors and a conveyor. In these methods, often when two doors are included, they are actuated and interlocked such that both doors cannot be open concurrently when the system is in use. Also frequently, the beam trap comprises a 90-degree transfer conveyor.

In the present methods, the photonic energy beam is often emitted from a photonic energy beam source mounted on a gantry. This photonic energy beam source is often moveable in X-, Y- and/or Z-directions. Also methods are provided wherein the photonic energy beam source is configured to impart a cut in a portion of the surface material at multiple angles or at different locations of the surface material or the packaging material. Often, in the present methods the photonic energy beam is split into multiple beams using a mirror, and wherein each beam is directed at the same or different process location and cuts the surface material at the point of contact. The mirror is occasionally not stationary, but rather is configured to move to re-direct or focus one or more of the multiple beams. Also provided are methods where the photonic energy beam contacts a mirror and is re-directed prior to contacting and cutting the surface material. The mirror in such methods may be stationary; and occasionally the mirror is non-stationary in such methods.

The present methods most frequently utilize a laser as the photonic energy bean.

The present methods also contemplate processing and opening of a package, wherein the package comprises a damaged portion in the surface material, wherein the damaged portion comprises an irregularity not present on an undamaged package of the same type.

As noted, the present methods contemplate opening a package on the fly, while not restraining or clamping the package while it is being cut. Rollers or other mechanisms manipulating the position, or holding the position, of a package are not necessary in the present methods using a photonic energy beam to cut the surface material of the package for reasons noted herein. Often here the package is cut while the package is in-motion relative to the energy beam source.

Methods are also provided wherein the photonic energy beam is emitted from a photonic energy beam source, and wherein the surface material of the package is cut while the package is in-motion relative to the energy beam source. Often the energy beam source is stationary when the surface material of the package is cut. In other embodiments the energy beam source is in-motion when the surface material of the package is cut.

The present methods contemplate processing packages having a surface material comprised of tape, cardboard, shrink wrapping, and/or stretch wrapping, among a variety of other materials noted herein.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

For clarity of disclosure, and not by way of limitation, the detailed description of the invention is divided into the subsections that follow.

Unless defined otherwise, all terms of art, notations and other scientific terms or terminology used herein have the same meaning as is commonly understood by one of ordinary skill in the art to which this disclosure belongs. Many of the techniques and procedures described or referenced herein are well understood and commonly employed using conventional methodology by those skilled in the art. All patents, applications, published applications and other publications referred to herein are incorporated by reference with regard to each issue for which they are cited, and related issues.

As used herein, "a" or "an" means "at least one" or "one or more."

As used herein, the term "box" is often used interchangeably with terms such as container or package. The terms "package," as referred to herein, encompasses boxes and containers of all sizes and configurations. Unless specifically stated or defined by virtue of conditions or requirements described herein, the terms box, container, and package are meant to be interchangeable as used herein.

As used herein, the term "surface material" refers to packaging material, including cardboard, paper, plastic, tape, metal, glue, rubber, thread, twine, rope, and other conventionally known packaging materials. The intended meaning of a surface material includes one or more materials, including multiple materials of the same type or different types.

As used herein, the term "cut" refers to cutting, unsealing, or opening of a material, typically a surface material.

As used herein, the phrase "process location" refers to a location on the surface material of a package identified during a measuring or evaluation operation, using 2D and/or 3D vision processing techniques contemplated herein, where a cut is planned using the systems of the present disclosure. The process location can comprise a single spot, multiple spots, a line, an extended portion, or one or more regions of the package. The process location may also comprise one or more different materials, including multiple layers of a surface material. Often the process location includes a particular place on a package to introduce a cut, for example, in a seam between two flaps on a box.

Figure 19:
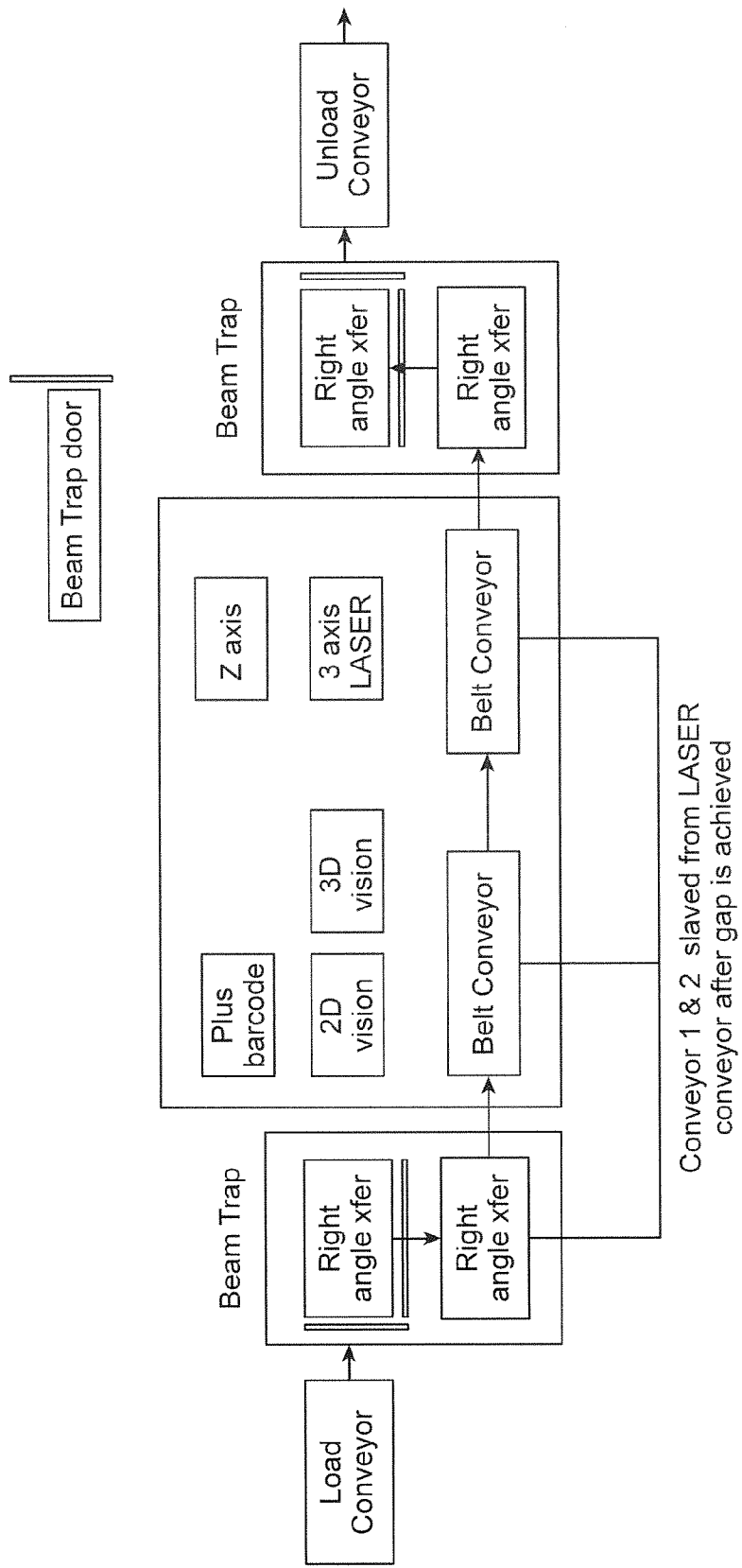
FIG. 19 provides one exemplary embodiment of an operative flow and layout of the present disclosure.
Figure 20:
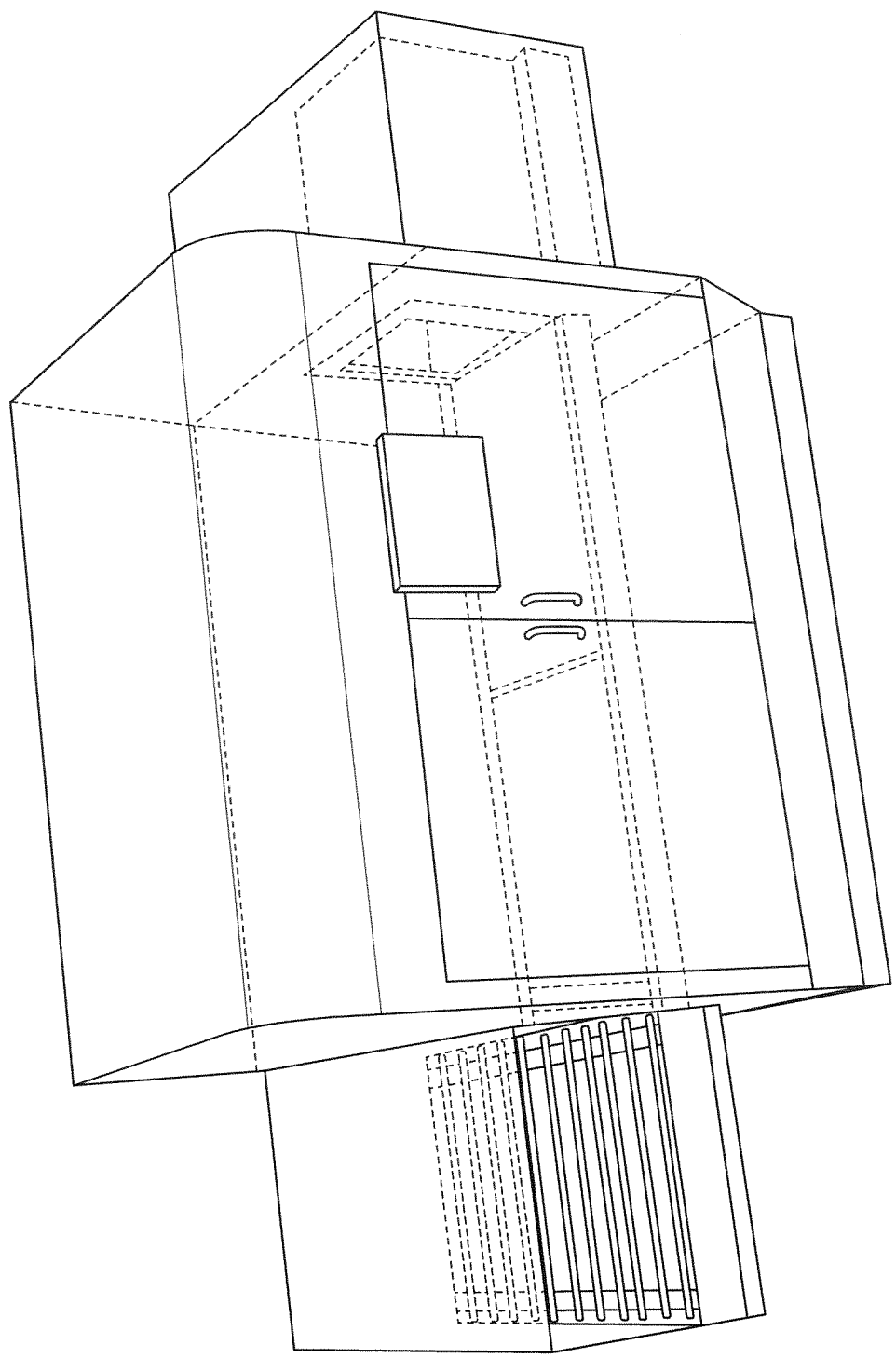

The schematic depicted in FIG. 19 provides one exemplary embodiment of an operative flow and layout of the present disclosure. The following provides a general description of the embodiment outlined in FIG. 19.

In feed or load conveyor—In certain embodiments, at least one zone of controlled zero pressure accumulation ("ZPA") conveyor is provided before the beam trap. Such a zone can be provided to control entry of items (e.g., boxes, containers, packages, etc.) to the next in-line zone, e.g., a beam trap.

Beam Trap

The beam trap zone provides, for example, a safety feature by trapping harmful light energy inside the system enclosure while allowing a constant flow of items in and out of the cutting system. Often an enclosed or semi-enclosed structure such as a light-tight housing is provided to trap light within the system. Often such a housing incorporates one or more doors or passageways for entry and exit to and from the light-tight housing. The beam trap aspect also may usefully be provided in a manner that aligns items on a transport mechanism such as a conveyor prior to entering a measuring zone. The beam trap aspect also may be provided to reduce the length of the system.

In particularly preferred embodiments, high energy beams are used in the cutting and opening process for items contemplated herein. Such high-energy beams can be harmful for those operating the system or within sight of the system. Therefore, often to address safety concerns, the cutting area is often provided in a light tight enclosure or housing. The beam trap permits items to enter and/or exit from the measurement zone and/or cutting zone, while maintaining or enhancing worker safety.

In certain embodiments, the beam trap allows for up to 1200 boxes per hour to enter and/or exit from the measurement zone and/or cutting zone without light escaping from the processing area. In certain embodiments, the beam trap comprises one or more right angle transfer conveyer along side one another completely enclosed except for the entrance and exit. In a variety of embodiments, the entrance from the in feed conveyor includes a high speed door comprised of, for example, light-weight light blocking (e.g., opaque) material. In such embodiments, the door can be controlled to open for a short duration, or otherwise as needed, to index a container such as a box, through the entrance to the measurement zone and/or cutting zone. This can be frequently accomplished with electronic logic and limit switches to detect the leading and trailing edge of the box before and just past the door. Once the box clears the door, the door can be shut and the box proceeds to stop at the end stop (in direction of travel) locating the leading edge of the box.

A second high speed door is often situated between the two right angle conveyors. In frequent embodiments this second door remains closed until the box is indexed into the first right angle conveyor and the adjacent zone in the second right angle conveyor along side the first right angle transfer is clear. The second door frequently will not open, or be programmed to open, unless the first door is closed, and vice-versa. In frequent embodiments the second door is electronically interlocked with the first door and can not be open at the same time.

In an exemplary embodiment, after the first door is closed, the second door open and the first right angle conveyor engages the box to move at 90 degrees to its first motion into the second right angle conveyor, often positioned along side. At this point, the transverse conveying components of the second conveyor often engage the box. The second door is often configured or programmed to close upon the box clearing the door threshold between the two 90 degree transfer conveyors, by for example, limit switches that provide the clearance indication. In a variety of embodiments, the box moves transversely until resting against the fixed stop at the opposite side of the second conveyor. At this point the box can be, for example, indexed and moved sideways until it rest against a rail locating on one side moving ahead (or backwards) until resting against another rail (which may preferably be retractable) thus locating the box on two sides (front and side). The rail intersection often comprises the corners.

In frequent embodiments the beam trap is accomplishing using in-line ZPA conveyors. Such conveyors often provide a cost savings. In such a case zone one and zone two of the beam trap are in-line with the second high speed door between them. Such embodiments provides one option not necessarily requiring the 90-degree transfer conveyors. In such embodiments, the box will not be located on two sides as noted above and the there is no baffle or maze effect to provide or assist energy shielding from the measurement and/or cutting zone(s).

Methods to allow constant flow of objects in and out of a light tight enclosure is provided herein, without interrupting the operation of the system.

In a variety of embodiments described herein, the beam trap is provided to maintain safety and prevent injury to factory workers and maintain the fastest processing rates possible.

Box alignment controlled with right angle box transfer provides an additional level of energy beam protection. Entrance baffles enhance such protection.

Measurement Zone

In frequent embodiments, boxes are conveyed from the beam trap to the Measurement Zone belt conveyor which speed is slaved from, or corresponds to, an adjacent belt extending into or through the measurement zone and/or cutting zone. The last conveyor zone from the beam trap transfers the box to the measurement zone belt in a manner that provides a sufficient gap between the previous box to provide for clear measurement or cutting delineations, avoiding interference between boxes. The conveyor in the measurement zone is typically in constant motion, but can be sped up or slowed down to balance box flow when working with random size boxes. Often the conveyor is connected to an encoder that provides position feedback relative to the forward motion of the box and various limit switches along the conveyor. In a variety of frequent embodiments a 2D camera is provided to capture an image of the top box surface with information locating the top with the box position on the conveyor. Proper field of view ("FOV") and depth of focus ("DOF") and lighting to capture all box sizes in the range specified. Often, multiple box images may be combined to enhance the measurement operation.

Figure 21:
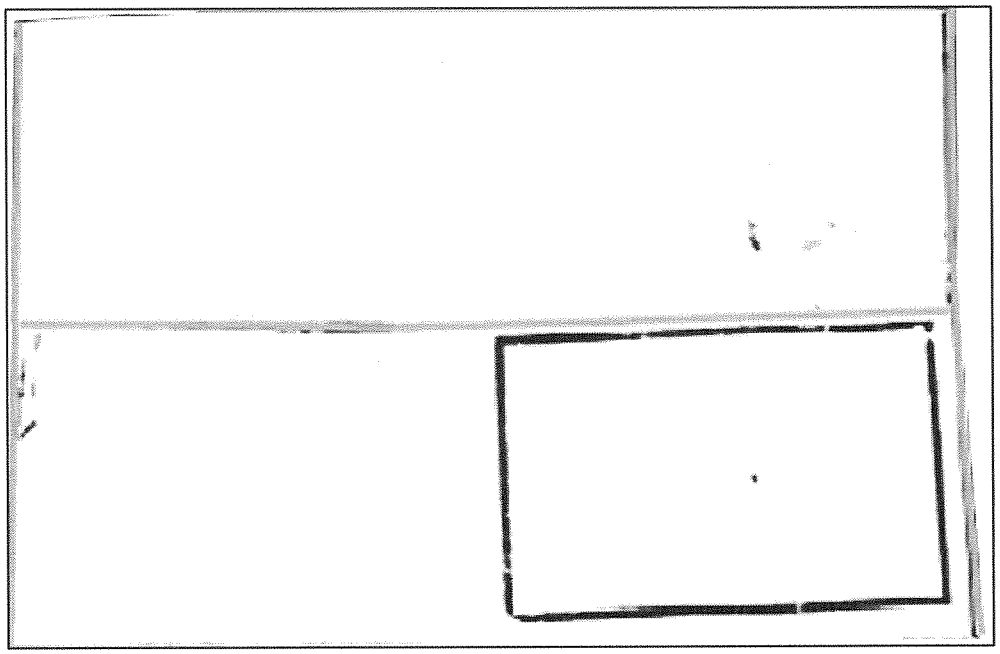
FIG. 21 depicts a 2D processed image of the top surface of a box as provided by one embodiment of the presently described systems.

As depicted in FIG. 21, in certain embodiments 2D images can be processed to locate the center seam of the box top along with reading any identifying indicia such as a bar code that may be present. In frequent embodiments, boxes for use in these embodiments are regular slotted cases ("RSC") and are loaded on the system with major flaps up.

In a variety of embodiments, boxes are frequently conveyed longitudinally with the longest side on the direction of travel. In such embodiments the seam will be located and processed properly if the box is conveyed or loaded incorrectly. If the seam can not be found through imaging in this manner, in certain embodiments the system is programmed such that the seam is assumed to be longitudinal.

Figure 22:
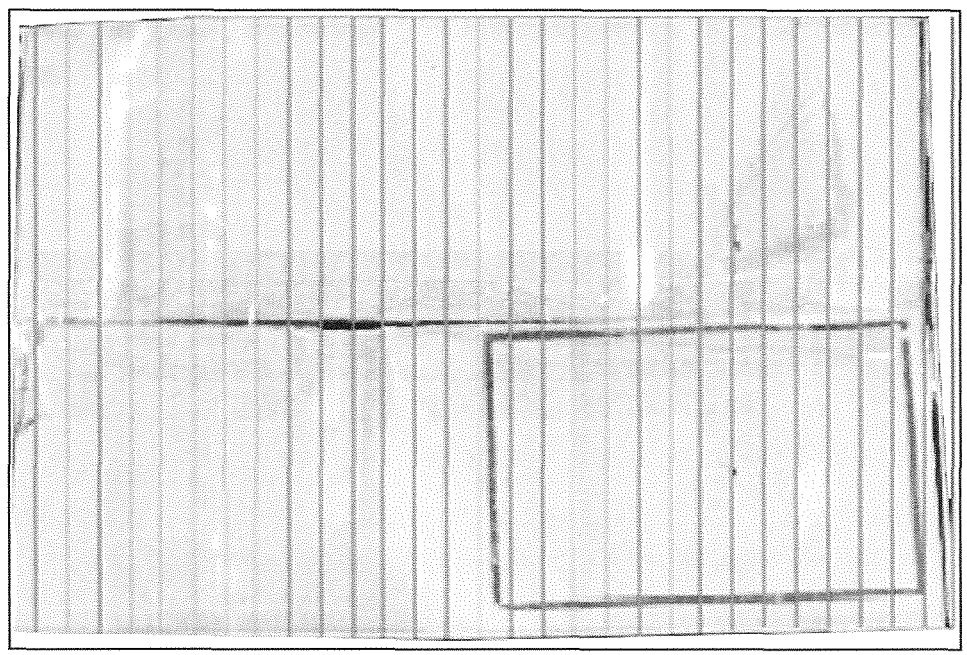
FIG. 22 depicts a three-dimensional ("3D") laser scan of the top surface of a box as provided by one embodiment of the presently described systems.
Figure 25:
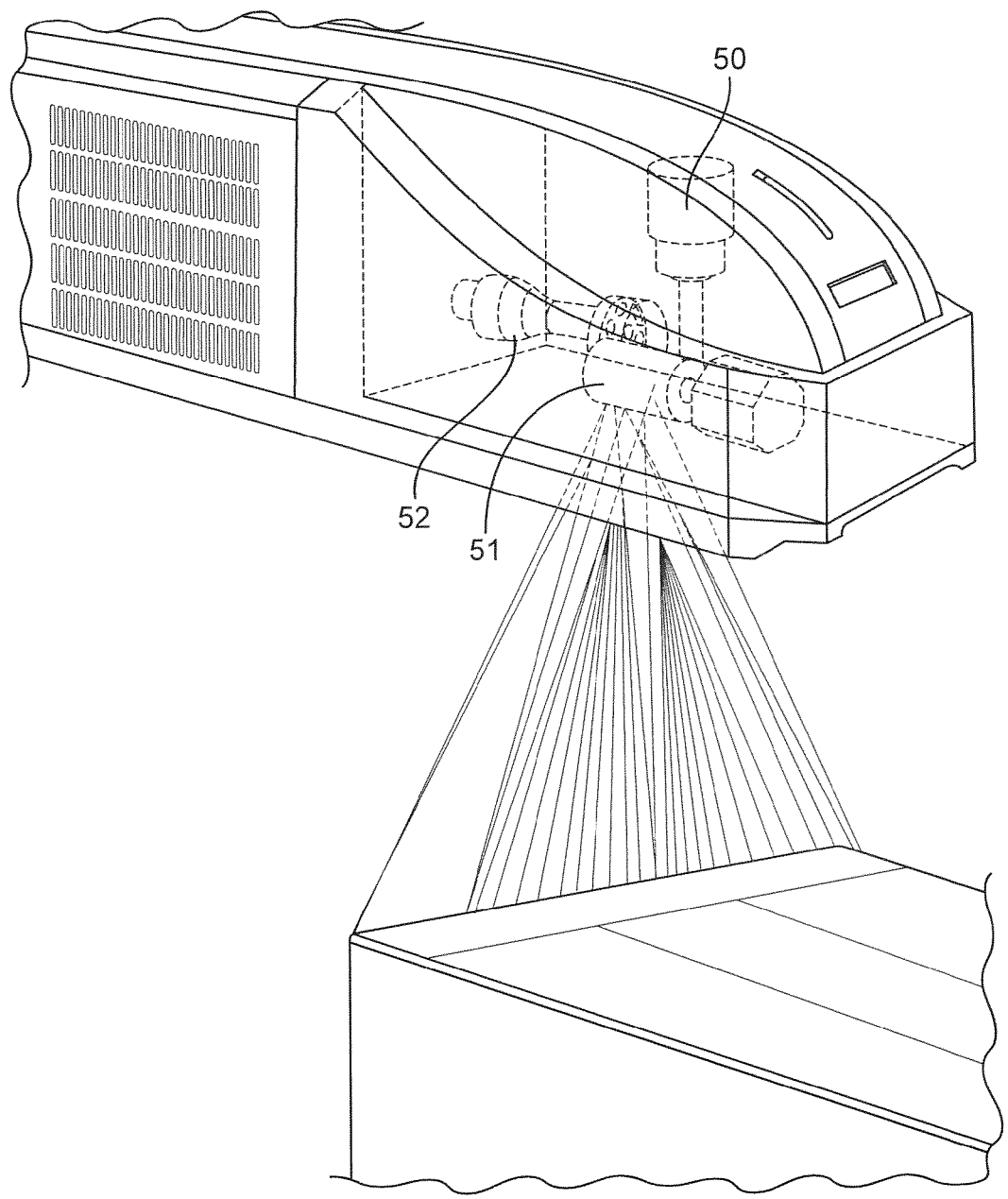
FIG. 25 depicts an exemplary gantry head containing X-axis, Y-axis, and Z-axis scanning technology.

As depicted in the embodiment depicted in FIG. 22, separate 3D measurements can be made to create a "relief map" of the top surface of the box. Here X, Y and Z coordinates, using X-axis, Y-axis, and Z-axis scanners—see FIG. 25 (50-52)) are collected at preselected intervals, such intervals are often triggered by the leading edge of the box (e.g., a photo switch) and delineated by encoder counts from the conveyor on which the box is traveling. In such embodiments the resolution of the data points is sufficient to guide the laser path with enough accuracy to properly cut or open the box without requiring an abundance of reference or measurement points to adequately process and communicate between the instrumentation in the measurement and cutting zones at the conveyor and interval speeds required.

Figure 23:
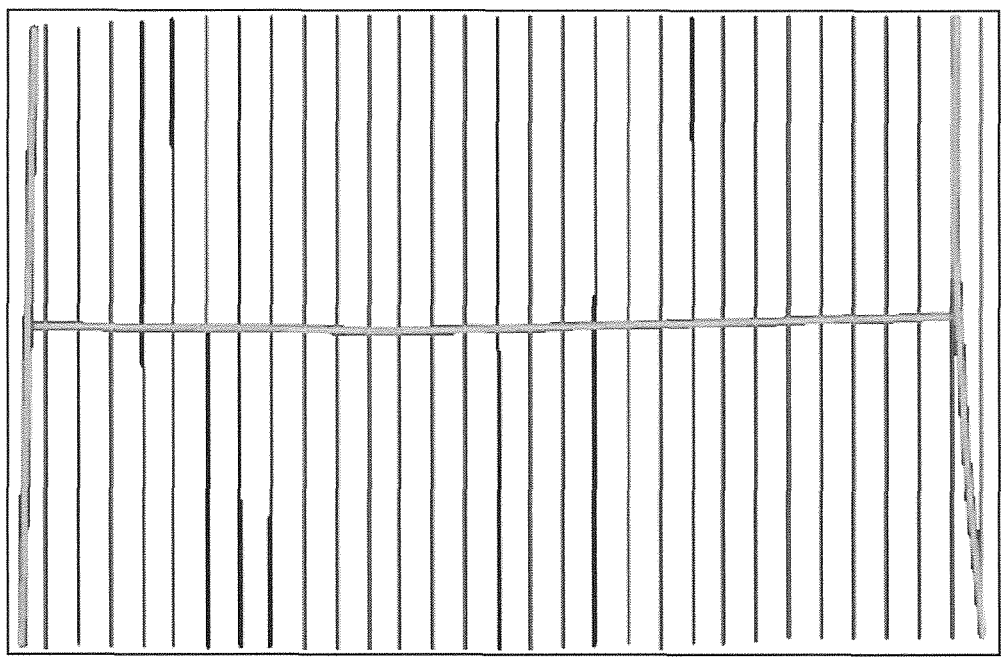
FIG. 23 depicts a representation of combined two-dimensional ("2D") and 3D data.
Figure 24:
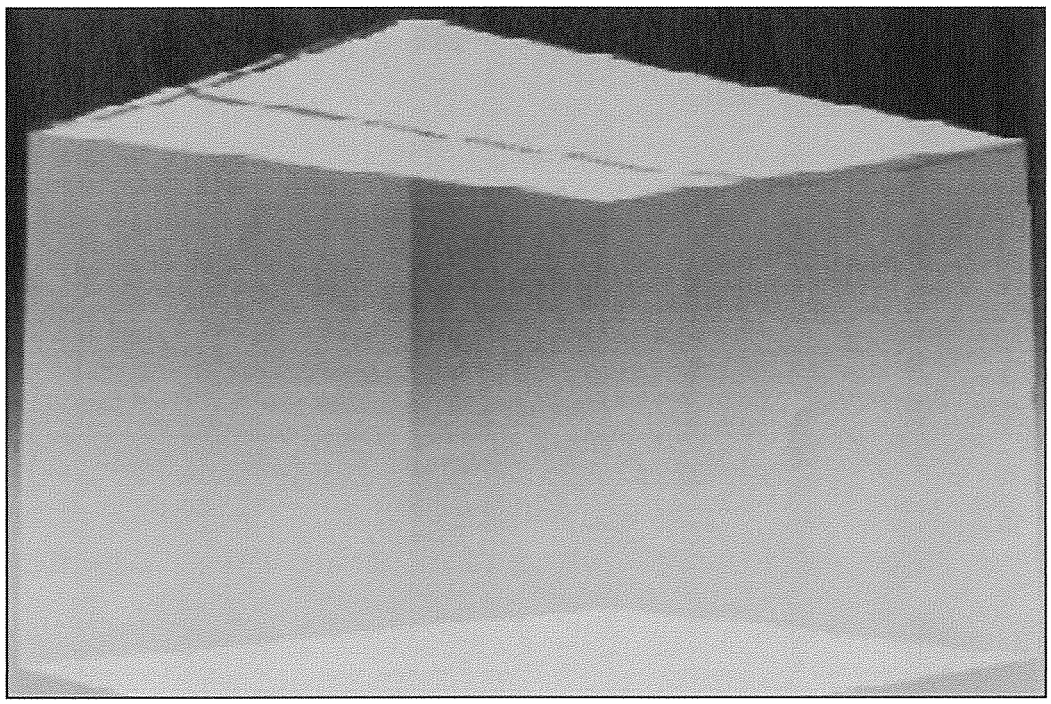
FIG. 24 depicts a 3D cut path as compared to original die lines of the box.

Often, as depicted in FIGS. 23 and 24, prior to the box arriving at the cutting zone, the position data from the 2D and 3D system are combined to create a detailed 3D cut path.

Cutting Zone

In frequent embodiments, to achieve box opening the cut path is often located and defined in a sufficient space on the actual or specific box surface to properly direct the cutting action. Often, boxes are random in size, condition, and deformity, therefore the individualized measurement and cutting can be important to proper processing and box opening.

The presently described box opening technique and system most frequently uses an energy beam such as a LASER, for example, to cut the box or box seals (e.g., tape). This cutting technology provides a number of benefits, for example, by reducing or eliminating cutting force imparted on the box and eliminating the need for clamping to hold the box in place against the cutting force. Such forces and clamping are needed when mechanical cutting systems such as blades are utilized. In frequent embodiments the box motion on the conveyor does not have to be stopped for clamping and can be cut while the box is moving; this provides important benefits by enhancing processing speeds and thereby improving throughput rates.

Reducing or eliminating cutting force on the box avoids distorting the walls of the box, which in the case of such distortion can change the box position and/or the cut path that can result in cut boxes that do not open. Moreover, force damage to boxes, and/or contents thereof, workflow jams are eliminated in the present methods and systems.

Consumable items (blades) are generally not needed in the systems of the present disclosure. Moreover, the presently described energy beam cutting provides uniform cuts and does note suffer from bad cut quality due to worn blades. In addition, downtime for blade changes is avoided in the methods and systems of the present disclosure. Moreover, maintenance is reduced while hygiene is improved by eliminating dust from the mechanical cutting operation.

Boxes are typically conveyed from the measurement zone belt conveyor to the cutting zone. The cutting zone conveyor is typically in constant motion, but can be sped up or down to permit cutting all required or specified areas on random size boxes. In certain embodiment, this conveyor is connected to an encoder that provides position feedback relative to the forward motion of the box and various limit switches along the conveyor. So as to balance the flow of boxes and maintain a desired or proper gap between boxes, the variation in the conveyor speed due to processing disctates speed and workflow for previous zones.

Figure 26:
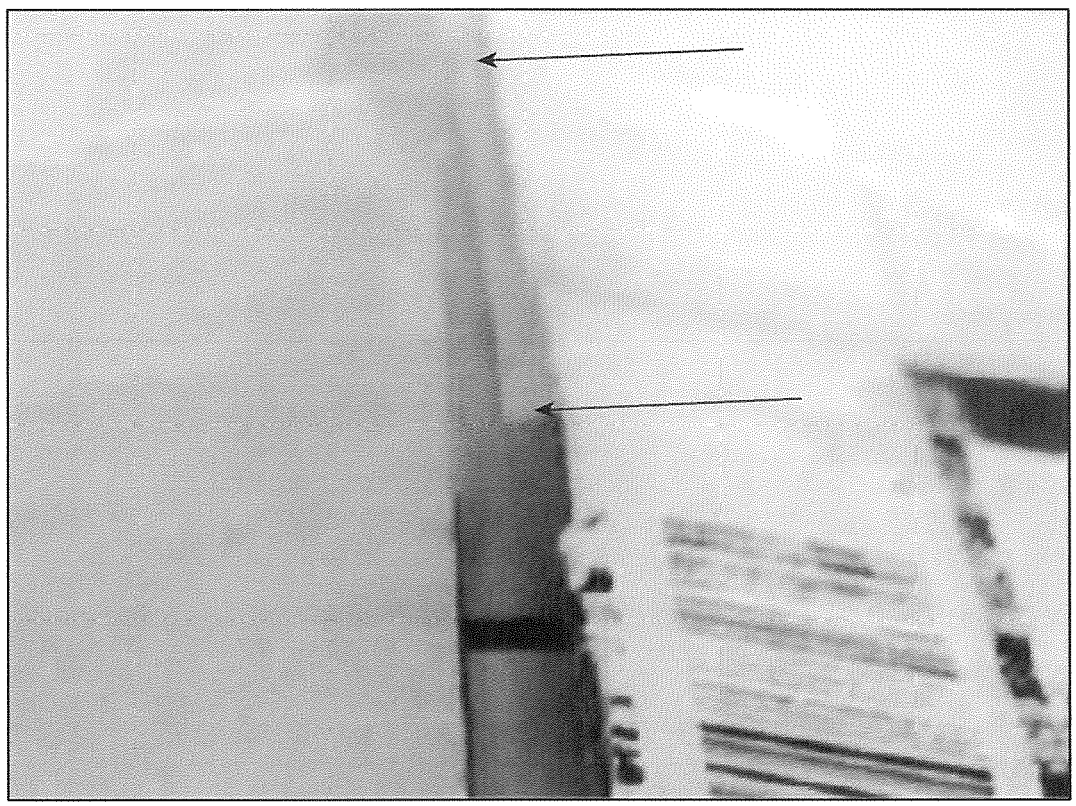
FIG. 26 depicts an exemplary cut of a tape seal using one embodiment of the presently described systems.

In frequent preferred embodiments, such as that depicted in FIG. 26, a $CO_2$ LASER comprises the energy beam device for the cutting boxes or their closures such as tape seals. Such a laser is often provided with sufficient energy and focal arrangement that the energy beam is capable of cutting the box or closure at high linear speeds.

In certain embodiments, manipulation of the energy beam is accomplished by a 3-axis "galvo" head. Most frequently, the cutting beam envelope encompasses the extremes of the widest box (e.g., across the conveyor) and motion of the conveyor will bring all parts of the maximum length within the cutting envelope. The "galvo" head is often provided with certain Z axis control for beam focus compensation on large angles and minor deviations in the box surface. In a variety of embodiments gross Z axis adjustments can be made by positioning the galvo head on a servo controlled Z axis.

Encoder tracking software often provides for a cutting operation while the box is moving on the conveyor. The software, in general, accounts for motion of the box on the conveyors and maintains the correct linear velocities in all vectors for correct cut penetrations. Often, set-up controls permit changes in the beam power and cut speed to provide the best and most reliable cutting results.

In certain embodiments, the cutting process is characterized by one or more of the following aspects in an ordered set of steps:

1. create 3D map of object (box)
2. generate a cutting path (series of line segments in 3 d space)
3. focus the energy beam to the point in space
4. vaporize material (cutting)

5. limit penetration by controlling
   a. beam position
   b. speed
   c. power
   d. focus (spot size)

Particulate, Gas and Vapor Evacuation or Dispersal

Though not wishing to be bound by theory, during the cutting process the photonic energy generally vaporizes the various paper and packaging material (e.g. tape, glue). Such a vapor cloud can interfere with the energy beam and is preferably moved by air flow away from the cutting area. Providing circulating or directed airflow to the cutting area often helps to dissipate heat buildup, if any, around the cut.

Exit Beam Trap

In frequent embodiments a beam trap is provided on the exit from the cutting zone to safely pass boxes outside of the box opening system, and prevent harmful light energy from escaping from the cutting zone. The exit beam trap is often situated similarly to the beam trap described above and elsewhere herein, and is configured to meet the workflow speeds of each other component of the system. In frequent embodiments, the exit beam trap allows for processing of up to 1200 boxes per hour without light escaping from the processing area.

Cut Path Determination

In a variety of embodiments of the present disclosure, the systems and methods can be provided utilizing conventional 2D vision processing and 3D laser scanning technologies. The present inventor has determined that these technologies can be combined in a manner described herein for the purpose of effective and efficient box opening in an automated or semi-automated platform on a continuous or almost continuous basis. In frequent embodiments, the 2D image processing uses proven algorithms to process a 2D image and determine characteristics of interest (e.g., box seams) and generate 2D vector data. Often this information is not sufficient to generate enough information to reliably and reproducibly generate adequate cuts with an energy beam device. Also frequently, Z-axis or height information is often required along the cut paths to determine the correct Z axis focus point for the energy cutting device.

The presently described methods and systems are useful in a variety of ways described elsewhere herein. In addition, these methods and systems are useful in that they permit an automated or semi-automated box opening mechanism for boxes that are not uniform in shape that is accurate, rapid, and reliable. Often boxes are not box-shaped due to manufacturing specifications or damage. Moreover, shipping boxes formed from the same die are typically not the same size after being packed, shipped and stored. Boxes can be subject to dents, dings, deformation and crushing suffered to various degrees when handled and shipped, which often forms the boxes into unique and random shapes. The sheer variety of available box shapes and sizes, as well as packaging materials, compounds the variability of the status of any particular box destined to be presented to the systems of the present disclosure for opening. The present methods and systems are not intended to be limited to opening any particular size, shape or type of box.

Often 2D and 3D image capturing systems field of view (FOV) are calibrated to each other for a common reference and scale with respect to the top surface of the box and box size range.

In certain embodiments a 2D image of a box top surface is captured with lighting to reveal features of the box surface that indicate the edges, corners, and flap seams in the top surface of the box. Frequently, using conventional 2D image processing techniques, 2D vectors (e.g., cutting vectors) are created from the image indicating the edges, corners and flap seams in the top surface of the box. A 3D scan of the top surface of the box often provides a matrix of 3D data points. The resolution of this matrix is frequently provided within the margin of error for an effective cut according to the present methods and objectives. The 2D vectors indicating point of interest (for making cuts) on the box surface are often correlated with the 3D matrix to turn the 2D vectors into 3D vectors. Interpolation is used in a variety of embodiments to estimate the Z (depth dimension) when the x and y values in the 2D data fall between the x and y values of the 3D data. As a consequence, in frequent embodiments, a set of 3D vectors (x, y, z) results, which describe, for example, the location of the edges and center flap seam of the box top surface. Often, this information is created in relation to the box regardless of its orientation as presented to the vision systems of the present embodiments. The cutting beam of the laser is frequently directed along these paths to cut, for example, sealing tape or the corrugate components.

In certain embodiments, a laser head (point at which the beam is focused) is manipulated mechanically in the X and Y directions (determined by 2D vision) with a Z alignment (often such adjustments are gross adjustments). Fine Z axis adjustments can be often made with fast responding focal controls provided on the laser head. In such embodiments, a general z axis measure of the box height is frequently made to permit the laser head to be moved into a finer window of z axis motion controlled by the galvo head. The z axis data for the fine motion control can be optionally derived from a displacement sensor looking just ahead of the laser during positioning across the box surface and providing high resolution Z axis surface height feedback for the electrically control focusing cutting laser head.

Measurement System Innovations

In the presently described methods and systems, it is often not assumed that boxes are rectilinear in shape. Moreover, in the presently described methods and systems, the box seam is most frequently identified rather than assumed to lie in the middle of a width measurement or that the seam is running longitudinal with flow. Rather, the present system identifies and locates the area of interest (box seams and edges) for cutting. In the most frequent embodiments, the area of interest for cutting is identified not using offsets.

Frequently, a 3D map of complex cut paths is created in space (not straight lines) which often carried an enhanced accuracy related to where the cut is needed. Moreover, the present system provides the capability of measuring a box that is in motion and without physical contact of the box.

Photonic Box Opening

Typically box opening is practiced in industry through utilizing mechanical means or a cutting blade in various forms including static, spring loaded or circular and spinning. Cut depth is mechanically limited by guides on the box and or fixturing that provide a limitation on the exposed cutting surface that can enter the box. The cut depth is the distance between the blade end (or tangent on circular blades) and surface to be cut.

The present systems and methods provide non-contact cutting. Such methods eliminate mechanical jams with cutting devices and machine down time. Mechanical forces imparted on boxes from the action of the cut that cause box deformation and movement with re-location of cut paths are also avoided by practicing the present description. Box clamping mechanisms, to hold or counter the forces imparted by the cutting action, are also avoided. Higher throughput is imparted, for example, by eliminating the need for box clamping. Clamping requires stopping the box for cutting and waiting for clamp actuation.

The present systems and methods provide an advantage since there is not cutting edge to wear. This, for example, eliminates the need for blades that often become dull or damaged, requiring periodic changing and replacement. Dulling blades also result in uneven cut quality.

Photonic cutting also provides for a more discreet spot cut. In contrast, blades have a cross section or a line of cutting into the material that requires additional axes of motion and imparts limitations on the radius of cuts and the speed at which direction can change.

Photonic cutting also provides faster cut processing times. Manipulating a beam with a "Galvo" mechanism provides for very fast accelerations/decelerations, unrestricted moves between paths and highly controlled path motions at higher speeds. In certain embodiments, path motions during a cut may require a controlled speed, but continuous processing ensures a rapid throughput versus conventional systems. Motions for cutting tape seals are especially slow with mechanical systems, for example, because of the "H" pattern of cuts typically seen with RSC (Regular Slotted Case) style boxes. The cutting head must be indexed from its home position to start the first cut then lifted and moved to a second cut then lifted and moved again to the third cut before moving to clear the box back to home position. In such a case, four cutting head moves are non-cutting moves and three moves are cutting. In contrast, the present energy beam can be blanked or cut off between cuts without lifting or regard to the path. When multiple cutting moves are required, they can be performed at a fraction of the time as compared to mechanical cutting systems.

The present energy beams are also not likely score glass containers inside box. In contrast, a metal blade coming into contact with glass vessels can create a score mark and create a weakness in the glass structure that would break under normal stresses at some later time. This is especially critical with glass bottles under pressure (e.g. sparkling wine).

Cut Depth by Material Density

Generally, boxes when handled and shipped suffer dents and dings into the corrugated material changing the overall thickness from the outside to the inside wall. Mechanically set cutting devices (blades) will cut at given thickness regardless if the corrugated material is compressed or not. This results in cutting past compressed corrugated material and potentially into the contents.

Though not wishing to be bound by any particular theory of operation, the present energy beams vaporize material from one side to the other at a rate dependent upon the level of energy across the cutting spot, time at the spot (speed) and the density of the material. Therefore, as the corrugated material becomes compressed it becomes in effect denser, which can decrease the energy beam penetration rate. In certain embodiments, the depth of cut for the energy beam becomes less for denser cross sections and inherently not prone to cutting past the compressed areas of corrugate if set to cut only the original cross section. With closed loop energy monitoring and energy beam in effect is at a constant sharpness. Often, however, the present system can be provided to compensate for this slowing to ensure a sufficient cut, even in compressed materials. In contrast, mechanical cutting means are unable to provide such an adaptation without massively over-compensating.

A cutting beam often provides speed advantages but may be less effective in cutting if surface measurements are inaccurate. Without proper focus in relation to the box surface, the beam may lack sufficient energy to cut. However this may be compensated for with optics creating a very long DOF (depth of focus). Drawbacks could include a large cutting spot, less energy density, and more energy imparted into the box. Such an arrangement could be provided for tape seal cutting only, which requires less energy. An energy beam device of the present invention optimally has a depth of focus ranges from 0.500" to about 8.00". As such, in certain embodiments a fixed energy beam source, for example not affixed to a galvo head, is utilized in the present methods and systems. Conversely, the energy beam source is often mounted on a gantry for providing cutting in two dimensions. Moreover, a special head providing multiple (e.g., 2 or 3) axis manipulation is contemplated herein for mounting an energy beam source.

Using an energy beam also offers an advantage of providing small multi-directional cuts (e.g., similar to a small DIA router) without concern for blade travel, lead or trail. Intricate cuts are possible with such devices, providing the option to have elaborate and customized cut outs. Using such customization allows one to prepare customized display cases from shipping boxes. Intricate cuts can be performed with as few as three axes compared to six axes using a blade. In certain embodiments, a galvo head system is provided having a head on multiple sides of the box or cutting zone to permit such cutting actions.

A 2D image processing device can also be provided to find areas of interest rather guessing or interpolation. One could also use a Z axis in such embodiments to provide gross manipulation of a galvo head. Such embodiments provide a good seal cut alternative. In certain embodiments a high power energy beam is provided, permitting very fast paths with multiple passes for depth control. Such embodiments can be utilized, for example, on deep cuts or thick corrugate.

Optionally, parabolic optics are provided to keep the energy beam perpendicular with box surface on large field areas. Such options are occasionally utilized on stationary boxes.

Optionally a parallel beam (e.g., on a galvo head) is utilized having a low power laser and an interferometer to measure the Z height of the box surface real time.

Also optionally a 3D measurement laser (rather than a separate photo switch) is utilized to trigger the leading edge of box to start 3D scanning.

In certain embodiments a zigzag cut pattern (sinusoidal) is utilized to enhance box opening.

In certain embodiments a 90 degree case transfer is provided for locating to one side and moving through light baffle.

Optionally, the present box opening system is combined with an automated receiving system. Such a combined system minimizes operator intervention and enhances throughput.

Also provided are methods of automating and enhancing reverse logistics operations. In an exemplary embodiment, returning boxes are weighed when processed by the systems of the present disclosure. This weight is compared to the shipping weight for a quick determination if all parts were returned before the box is opened and touched by workers in the operation.

Also disclosed are methods by which 2D data is blended with 3D data to derive 3D data from the 2D data.

In certain embodiments, the box top is cut off rather than the side. When such an operation is utilized it is advantageous to cut deeper where minor flaps are expected.

In certain embodiments, plastic wrap, stretch wrap, or shrink wrap is cut from trays or packaging.

In certain embodiments a SCARA robot manipulated LASER cutting feature is provided having a beam down the center of the spline shaft. Here a mirror in head directs beam to one of four quadrants to duplicate four blades and eliminate turning head (4$^{th}$ axis)—e.g., using a micro stepper with mirror. In such an embodiment, the beam can be omni directional, thus rotation of cutting surface is not required to provide for intricate cutting. Creation of, for example, display boxes with elaborate cut outs or perforations can be created with this and other embodiment of the present disclosure. In certain embodiments the beam head would permit the beam to pass straight through (out the bottom for top panel cutting) or out side for side panel cutting.

Occasionally cut speed and power may need to vary based on corrugated thickness and number of plies. In such embodiments it is important to determine the corrugate thickness to set the system. In the case of energy beam cutting, the density of the corrugate (flute type) would determine the energy setting for beam cutting. Cutting depth is controlled, for example, by speed, energy, focal length, and density of material to be cut. The focal length can be adjusted to limit cut depth. In practicing such methods in certain embodiments one can cut an angel out from box vertical edge so if beam penetration occurs, the beam will emerge on the side of box away, from the contents thereof.

FIGS. 1-6 depict an exemplary package processor (40) of the present disclosure. A control panel (2), for example, is depicted in the upper right of FIG. 3 (also depicted in FIGS. 1-4), which is often a touch sensitive control screen for determined which cut program to operate. In addition, safety controls such as emergency stop buttons (4), and start and stop program buttons (3) are often included. Such buttons may be further controlled by safety interlock switches on the lids, conveyor doors, and/or front sliding access panels to prevent operation of systems while not fully enclosed.

Figure 1:
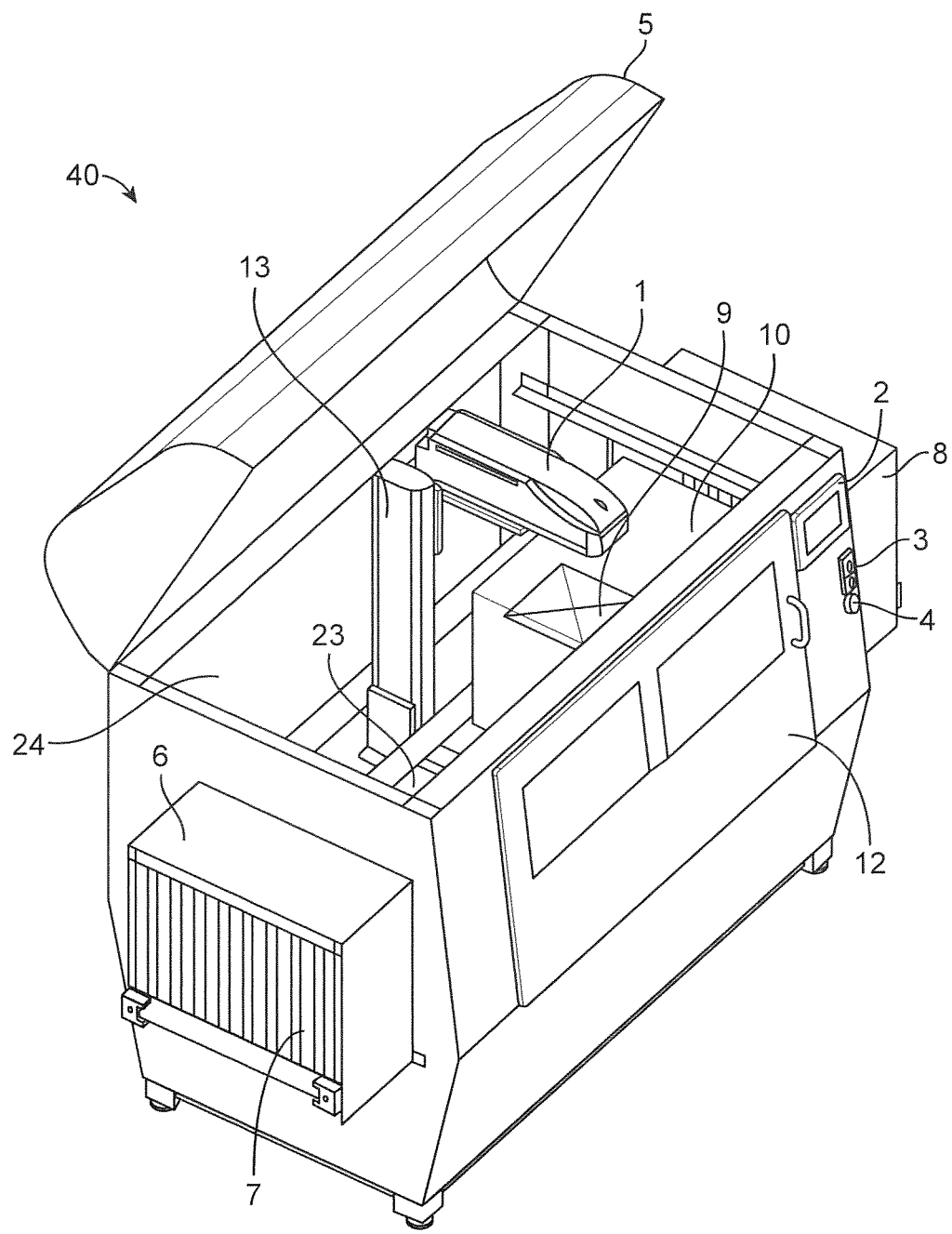
FIGS. 1-18 and 20 depict various views of an exemplary system, or components thereof, according to the present disclosure.
Figure 2:
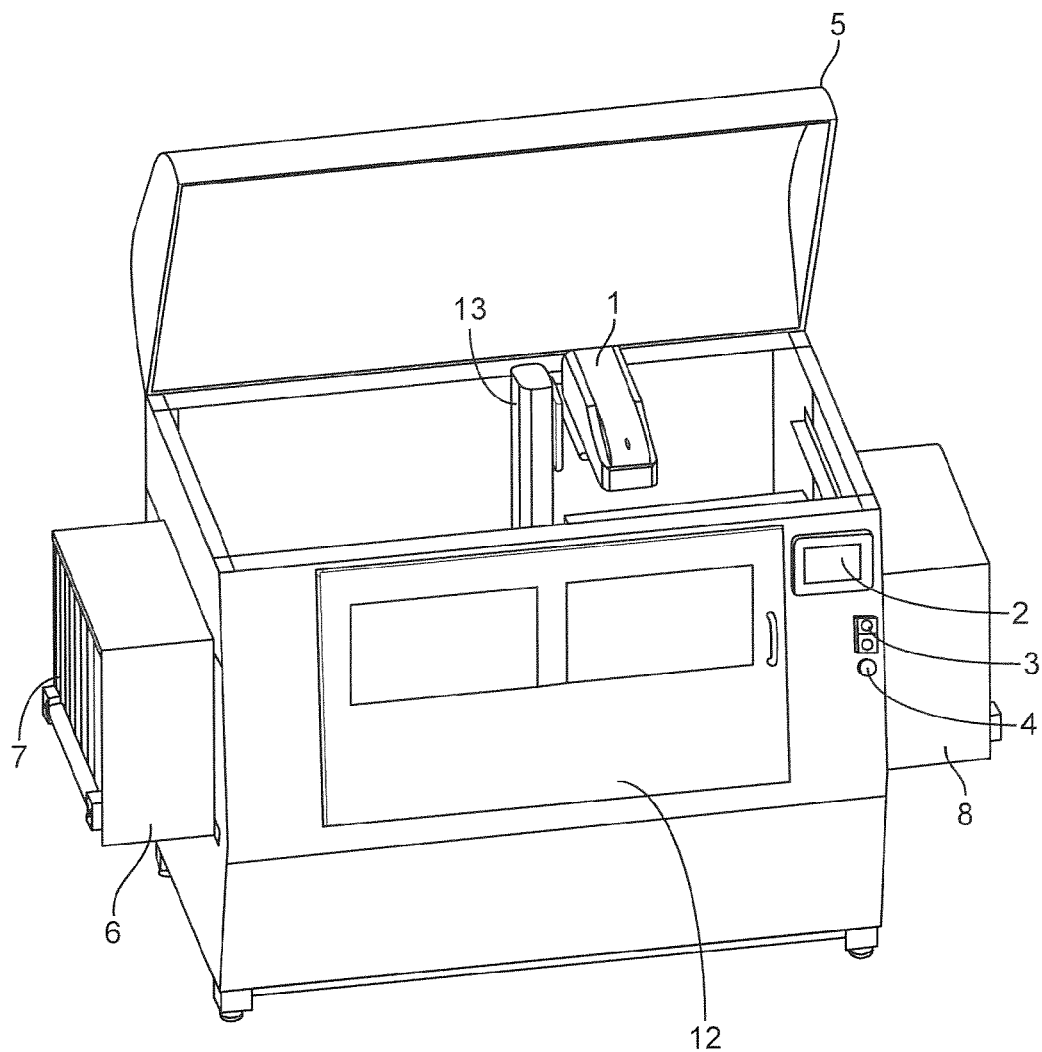
Figure 3:
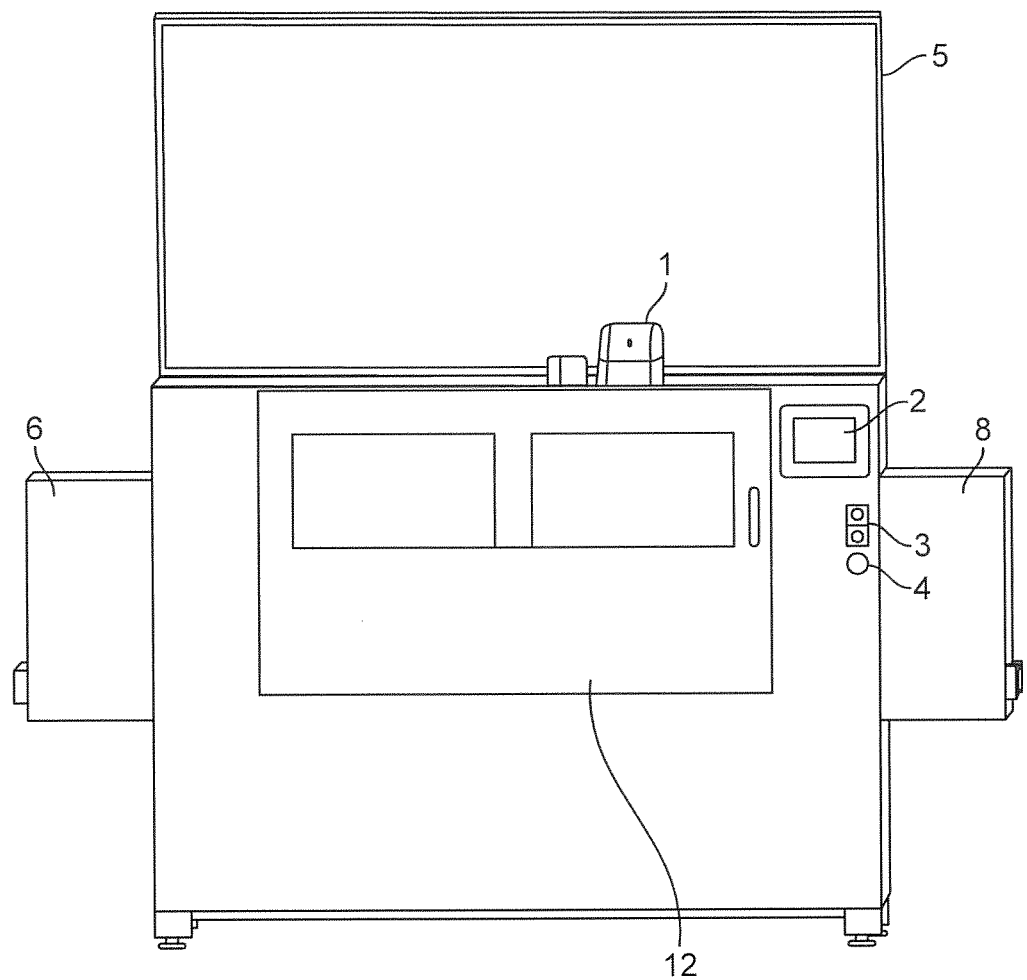
Figure 4:
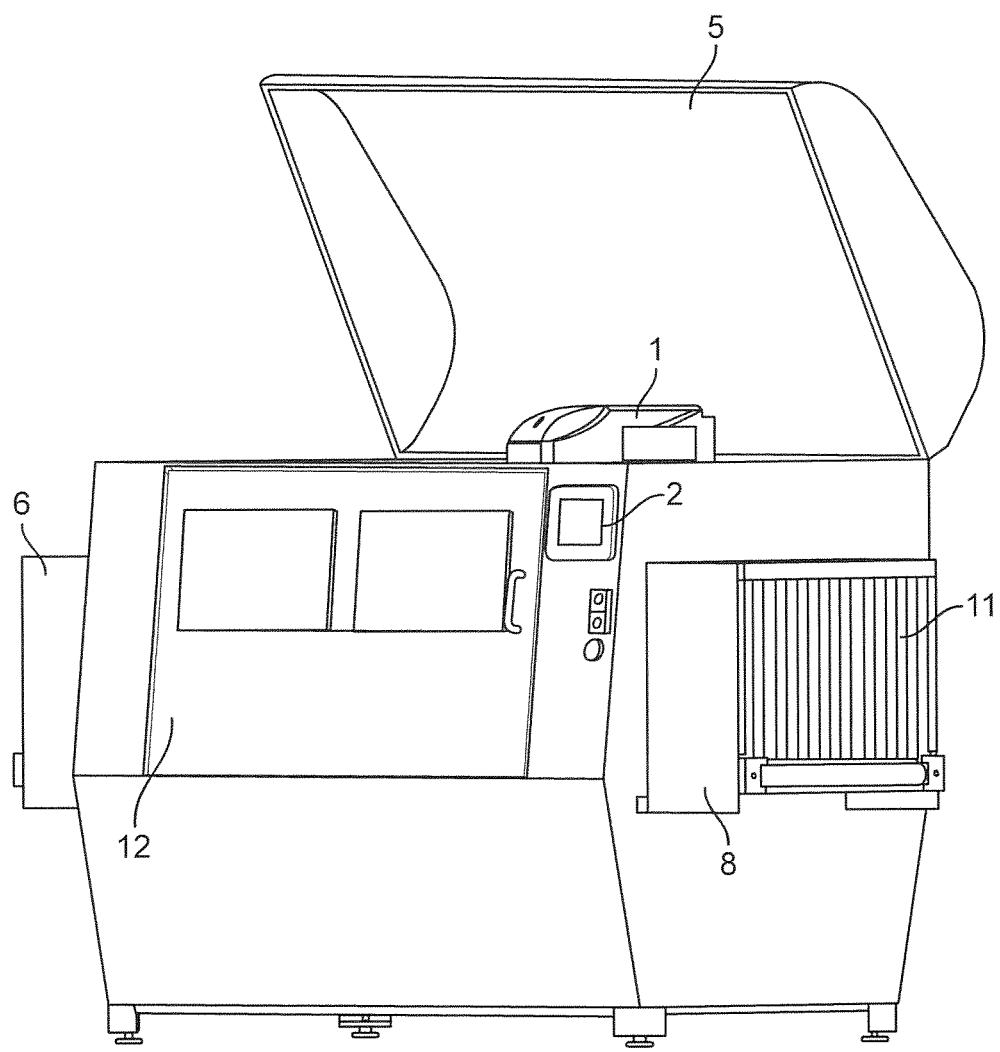
Figure 5:
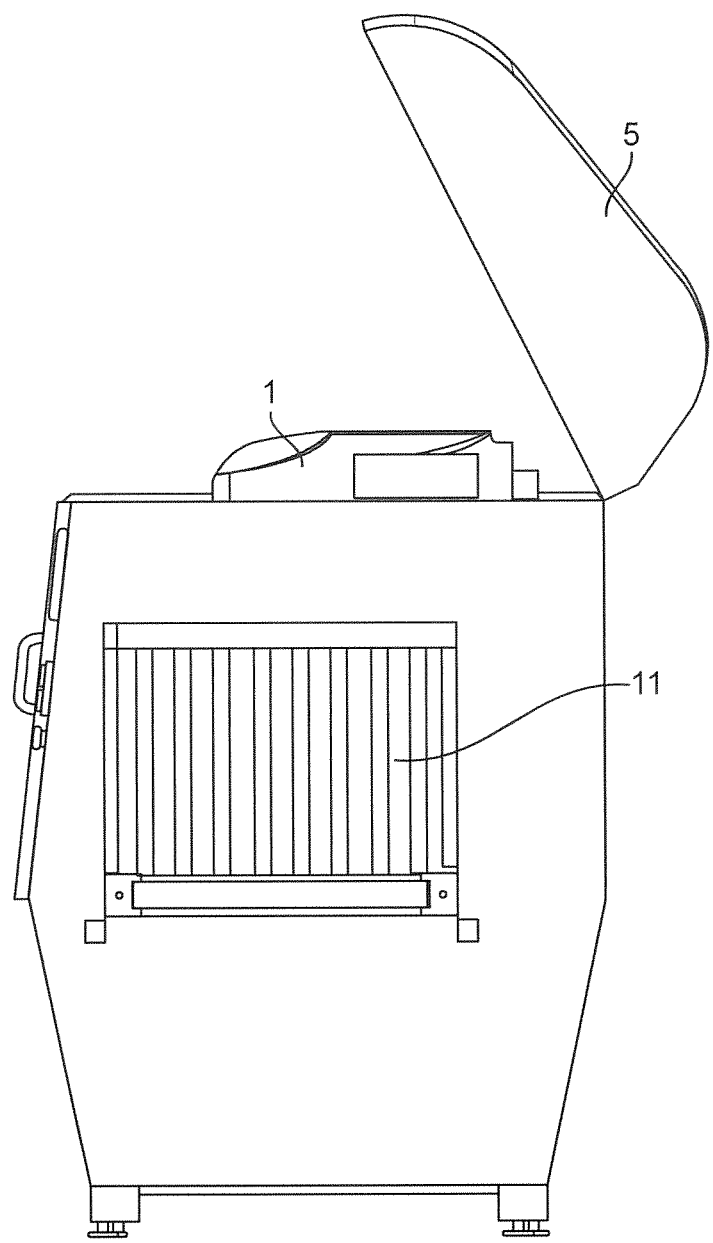
Figure 6:
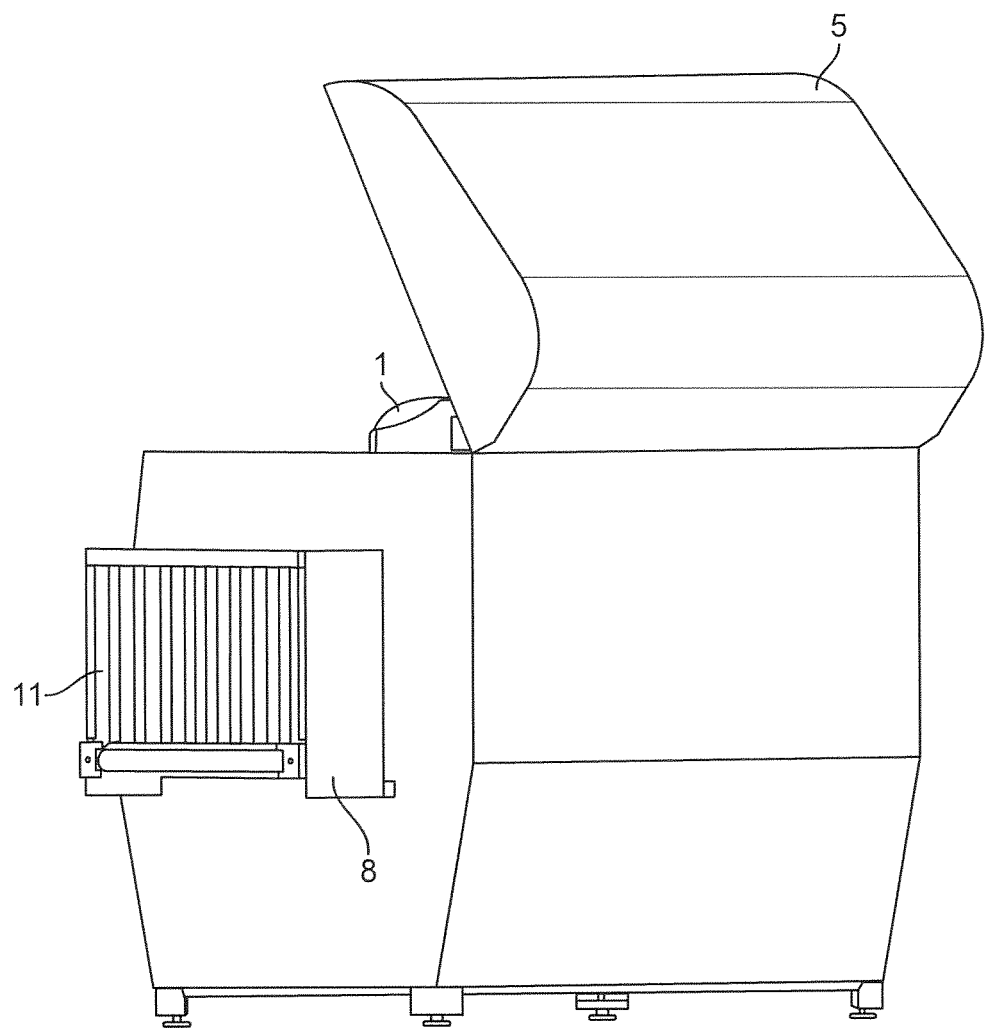
Figure 7:
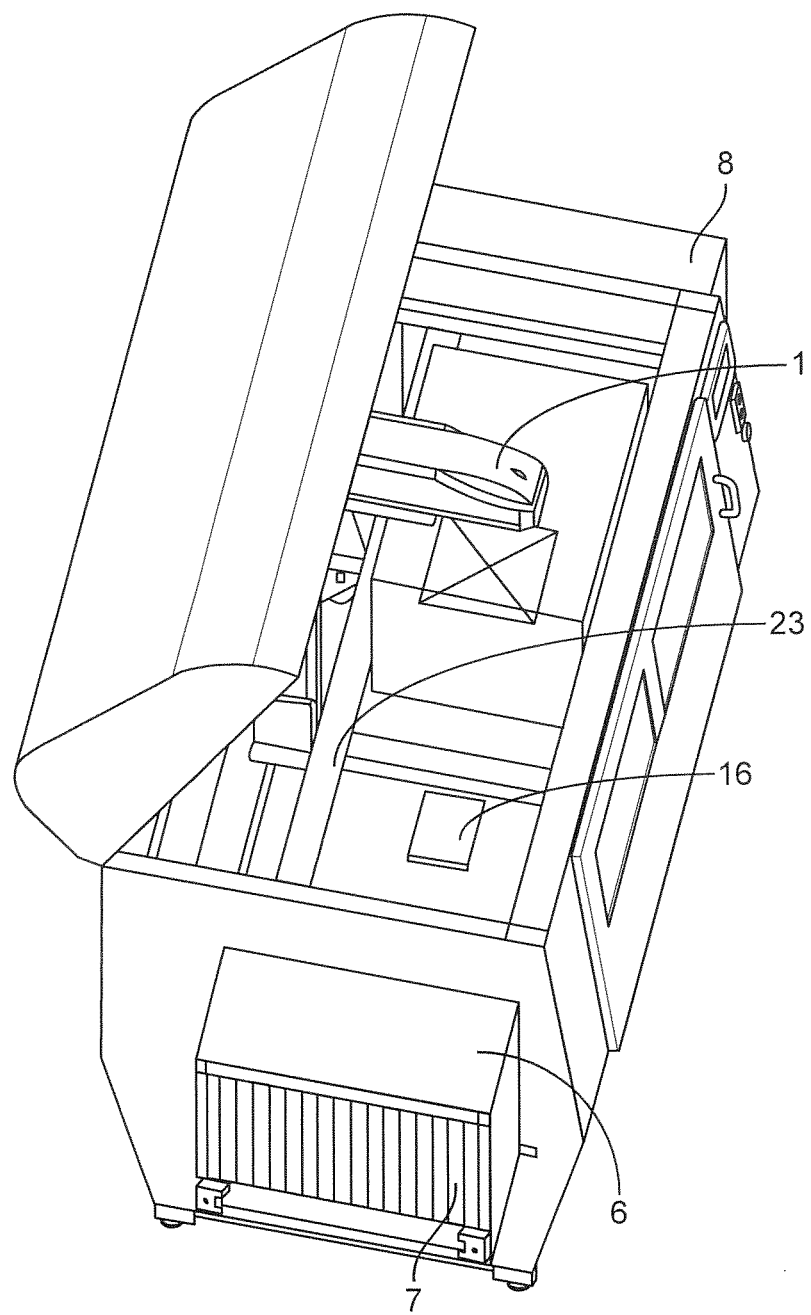

FIG. 7 depicts a view into an opened lid (5) of an exemplary package processor (40) of the present disclosure. This Figure depicts the imaging/cutter head (1) suspended via a support arm (13) which may optionally be movable front to back or side to side in relation to the front edge of the machine (where sliding door is located), i.e., in a plane parallel to the conveyor (23).

Additionally, imaging/cutter head (1) maybe vertically positional such that it may be raised and lowered with respect to achieving positions closer or further from the upper surface of the conveyor. Adjusting the height of the head may increase or decrease the field of vision (9).

Figure 8:
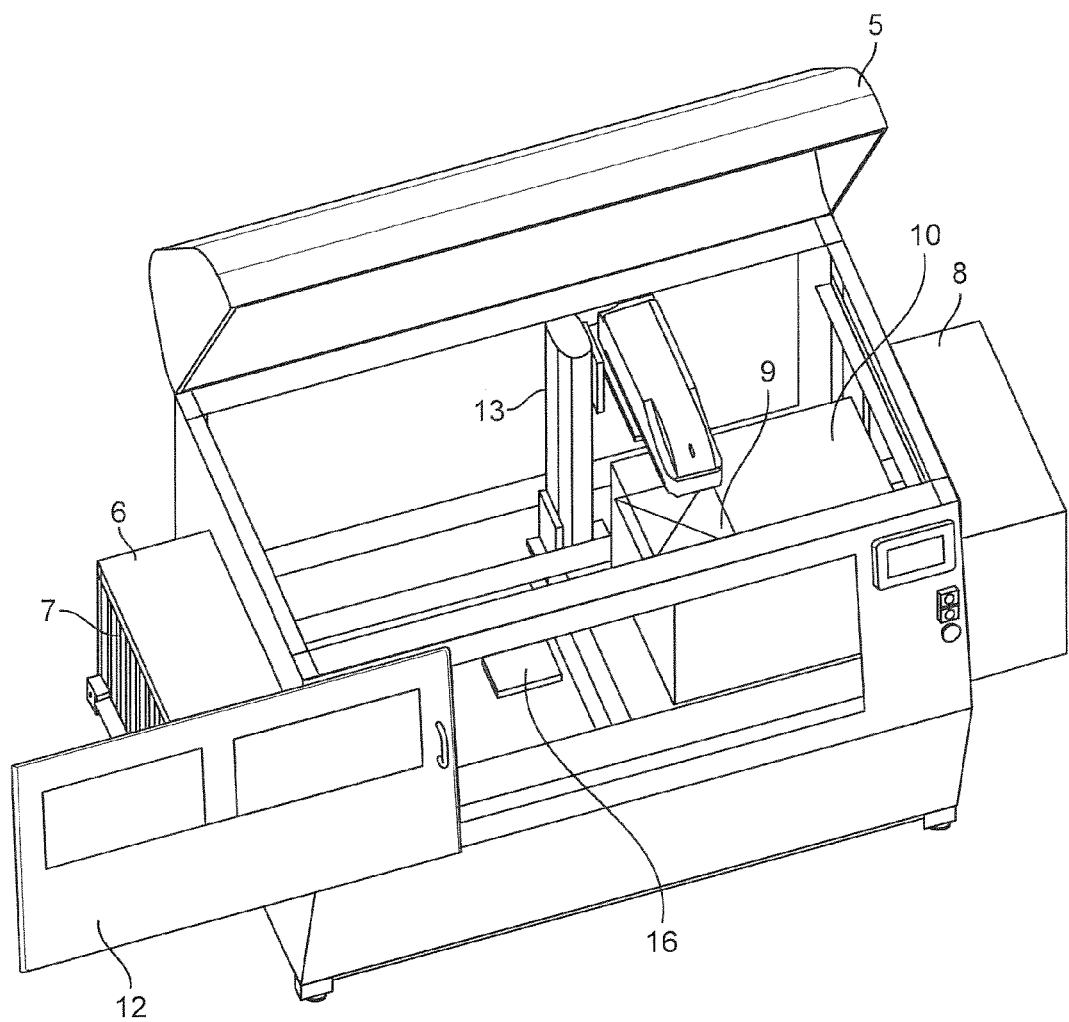

FIG. 8 depicts an exemplary package processor (40) of the present disclosure with the sliding door (12) in an open position. In this view, two boxes (10, 16) can be seen inside the machine of substantially different sizes. Additionally, the use of multiple conveyors (14, 15) can be seen for moving multiple boxes independent of each other for) independent processing of each. Though the drawings are shown with two conveyors (14, 15), one skilled in the art would appreciate that more or less conveyors could be used, and although belt conveyors are illustrated any of a variety of other types of conveyors could be utilized. In another embodiment, a plurality of bi-directional rollers, independently driven, are utilized to position boxes upon the conveyor surface.

Figure 9:
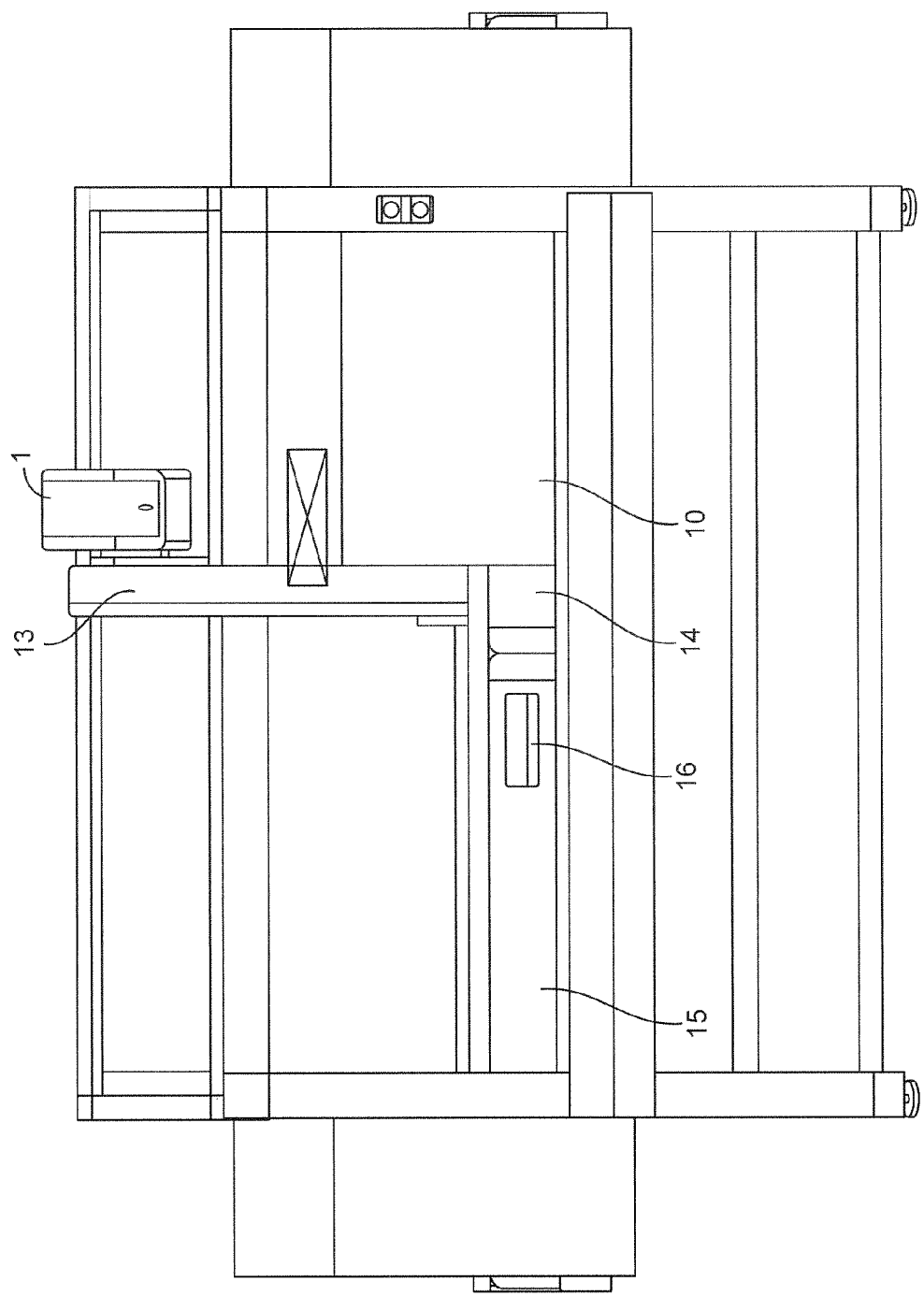
Figure 10:
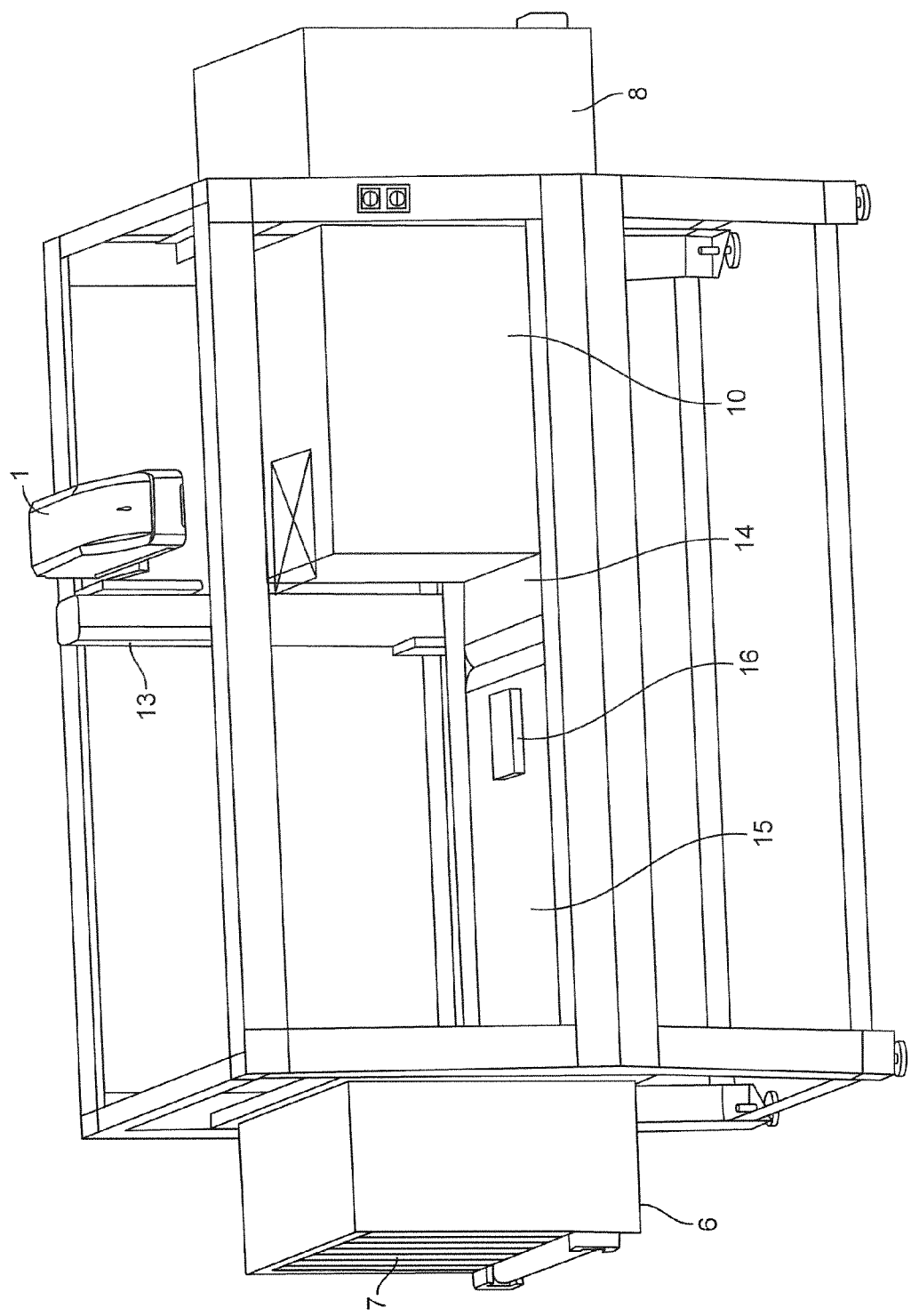

FIGS. 9-10 depict an open exemplary package processor (40) of the present disclosure, having the safety enclosure removed. In this view, exemplary beam traps (6, 8) can be seen on the right and left ends of the processor (40).

Each beam trap (6, 8) includes a high speed door (7, 11—see also FIGS. 5-6) which allows boxes to pass into and out of the system, but then close over the opening to allow safe use of the photonic cutting beam. In a single door beam trap as illustrated here, the photonic beam must be switched off when the door is opened. This safety feature can be controlled by interlock switches which interrupt beam power when the door is opened, or preferably by central control of all machine operations by a computing system to prevent untimely interruption in beam power which may affect operations of the box processor.

In another embodiment, the beam trap (6, 8) may contain multiple doors with enough space there between to accommodate the boxes entering or leaving the machine. In another embodiment, the multiple doors may not be linearly configured and/or parallel aligned such that a direction change of the box may be necessary, and/or desired. In such a multiple door configuration, the first door can open to admit a box into the beam trap, and once the first door is closed, a second door can open to allow the box to continue into or out of the machine. Such a design allows continuous operation of the photonic cutter as stray beams may never be exposed to the external environment due to one of the doors always being closed.

FIGS. 11-15 depict a box progressing through an exemplary enclosed package processor (40) of the present disclosure, for processing with a single cutting/imaging head (1).

Figure 11:
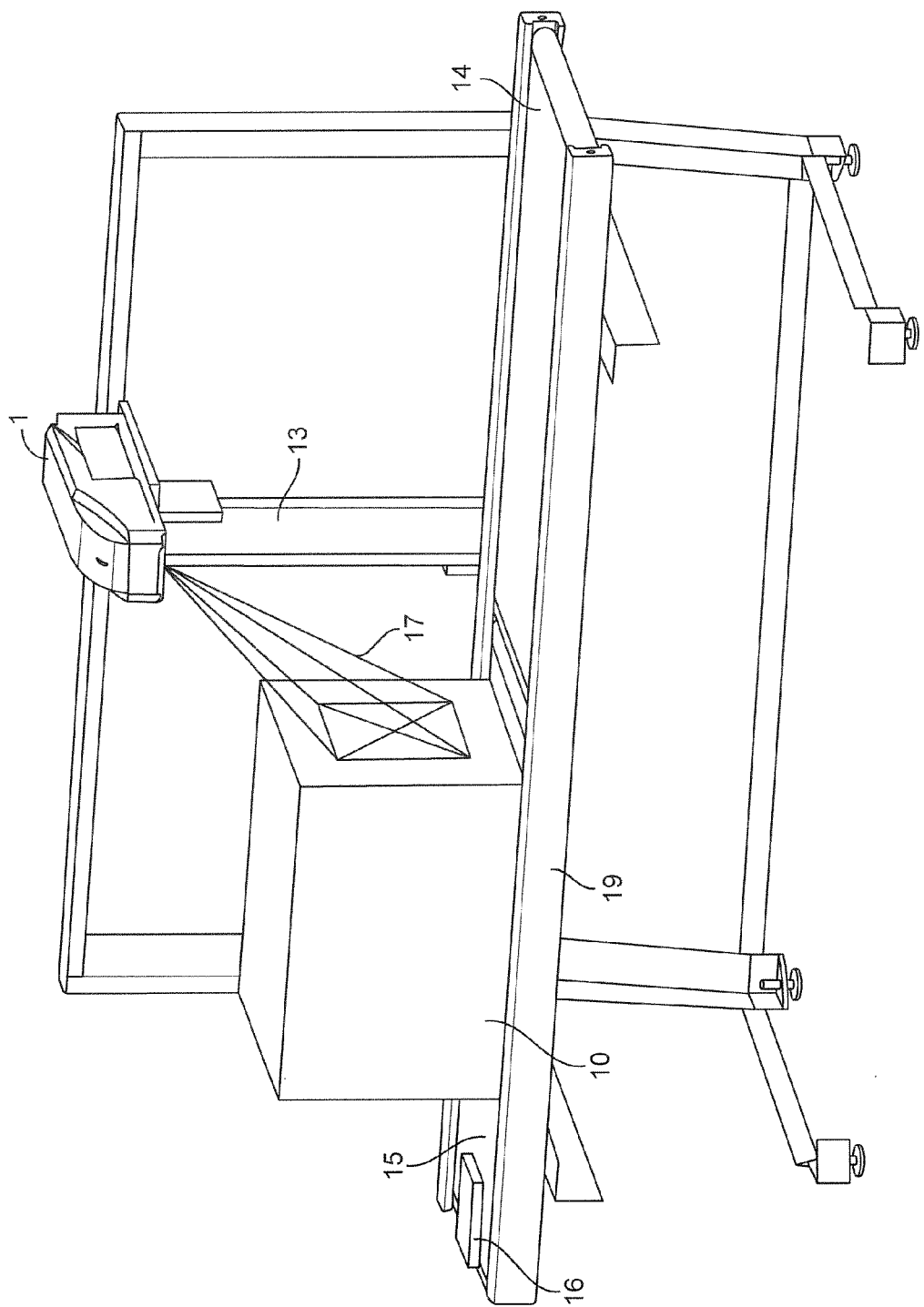

FIG. 11—depict a box (10) entering one end of the processing field (24) which is the interior of the machine. The imaging portion of the head (1) uses photo cameras and/or ranging devices to determine the size of the box. As the box enters the system, the camera may be deflected, or rotated to view the leading edge of the box. In doing so, at least the width (across the conveyor) and the height (above the conveyor) can be calculated for one or more points on the box (10).

Figure 12:
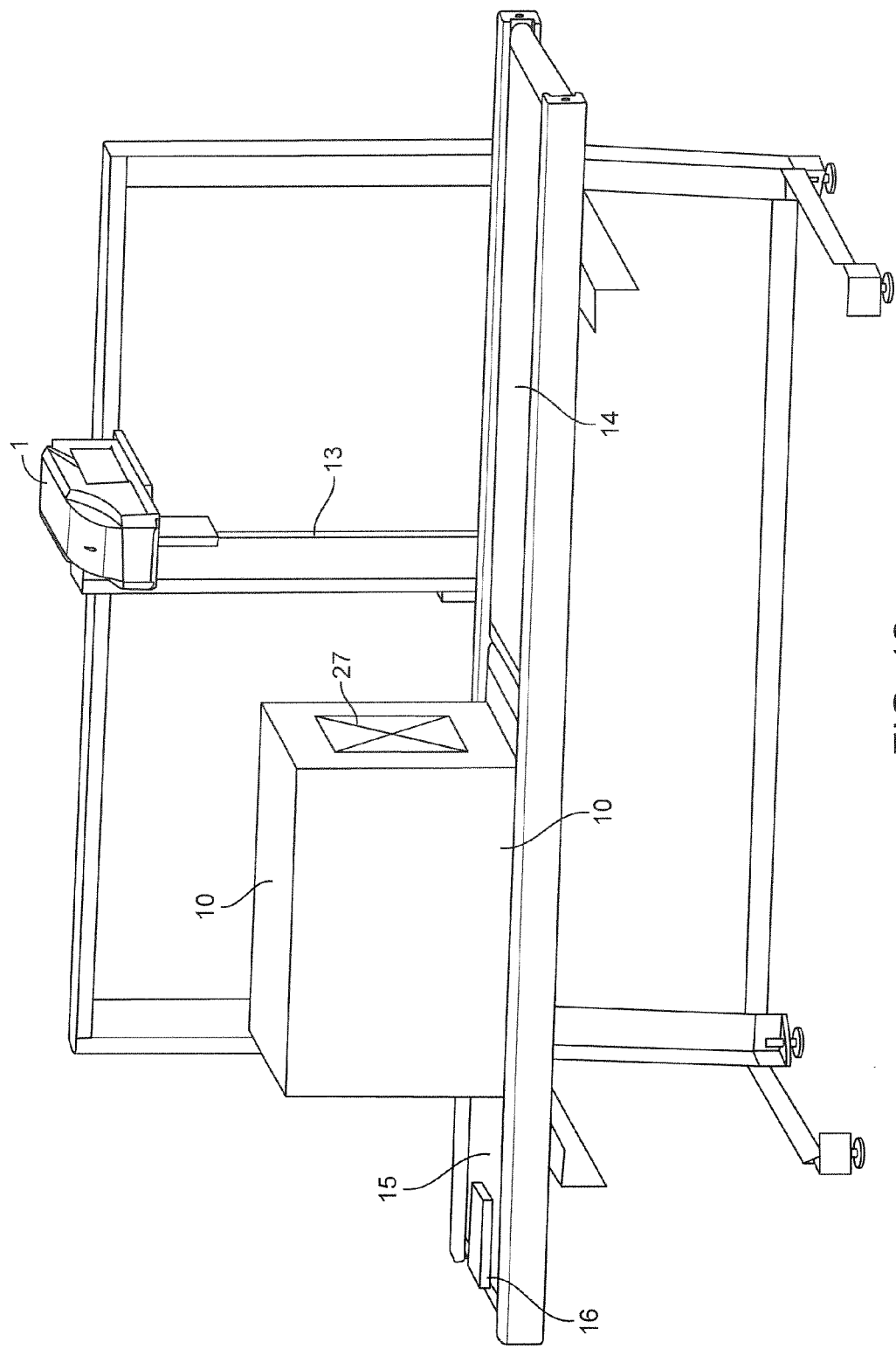

FIG. 12—depict a box a label (27) which may be affixed or provided on one or more surfaces of the box and may be viewed and interpreted by the system. Such labels may contain identifying indicia allowing the machine to determine one or more parameters such as desired cut patterns, material thickness, orientation, etc.

Figure 13:
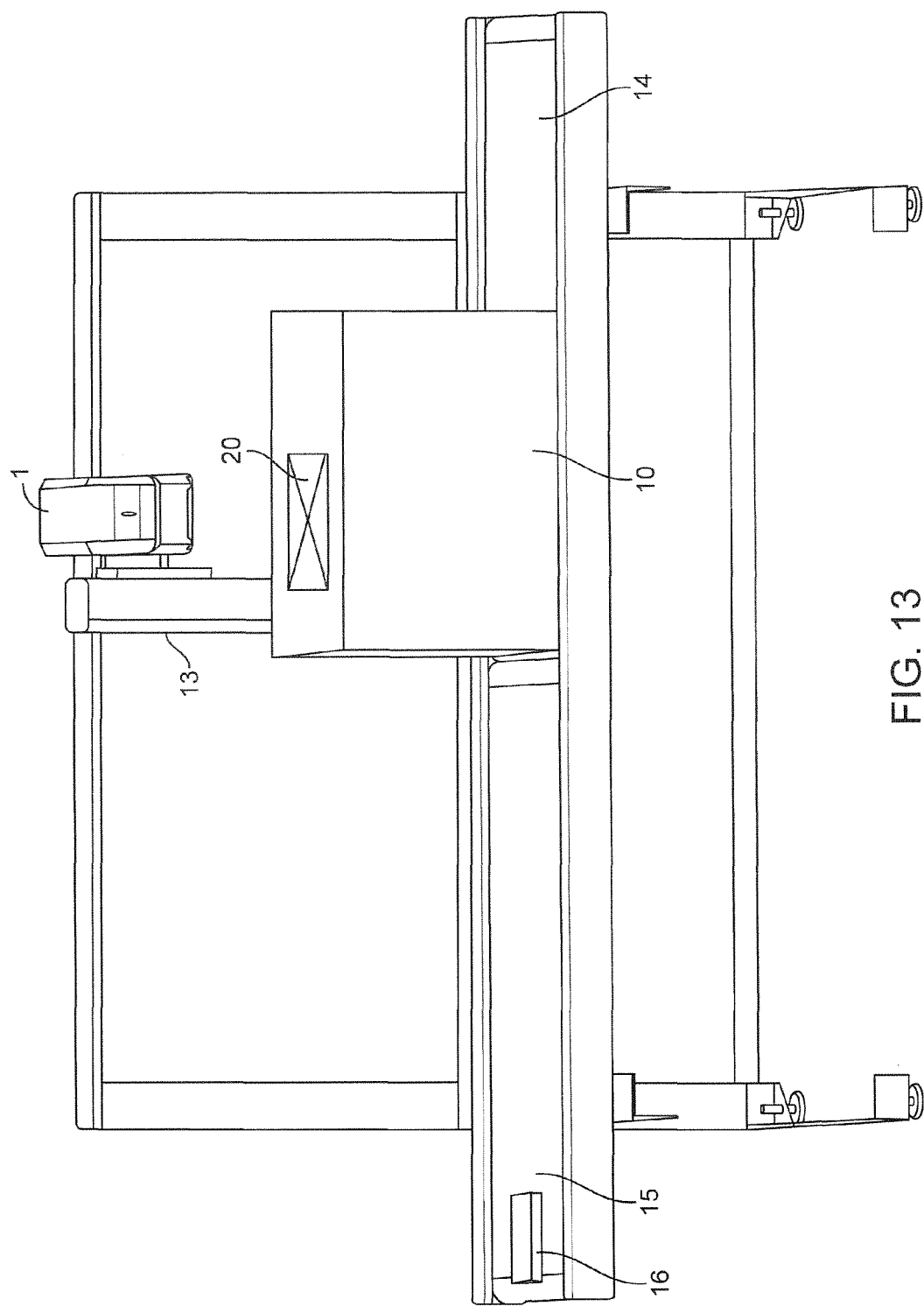

FIG. 13—depict a box (1) progressing through an exemplary package processor (40) of the present disclosure. In this illustration, the box (10) has been advanced further into the processing field (24), and the cutting/imaging head (1) identifies the upper surface of the box (denoted by aspect 20). In doing so, at least the length (linearly in line with the direction of travel) of the box (10) may be determined. The use of imaging cameras and range finders would allow identification of packaging tape, seams, etc. Further, the device, utilizing software to combine the data received may determine precisely in a three dimensional space exactly where portions of the box exist which are to be cut. Additionally, the camera may utilize mirrors on the sides of the machine, or the head (1) may be repositionable to allow processing of the sides of the box (10).

Figure 14:
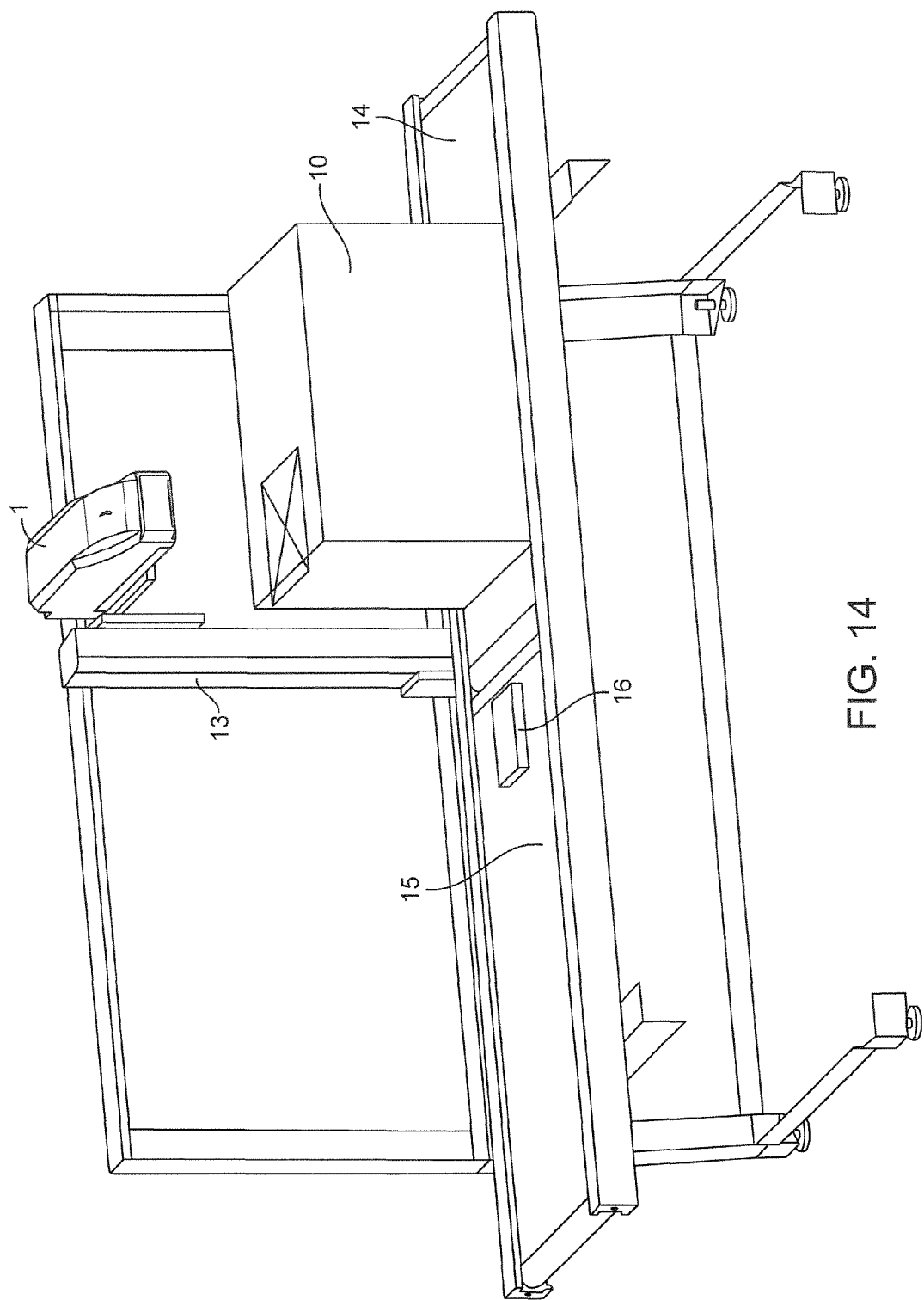

FIG. 14 depicts a second box (16) which may be staged independent of a first box (10) through the use of multiple independently controllable conveyor surfaces (e.g., 14, 15). While a first box (10) is processed, a second box (16) may undergo positioning, orientation, or other operations to speed the processing of all operations through the use of overlapping time sequences in processing steps.

Figure 15:
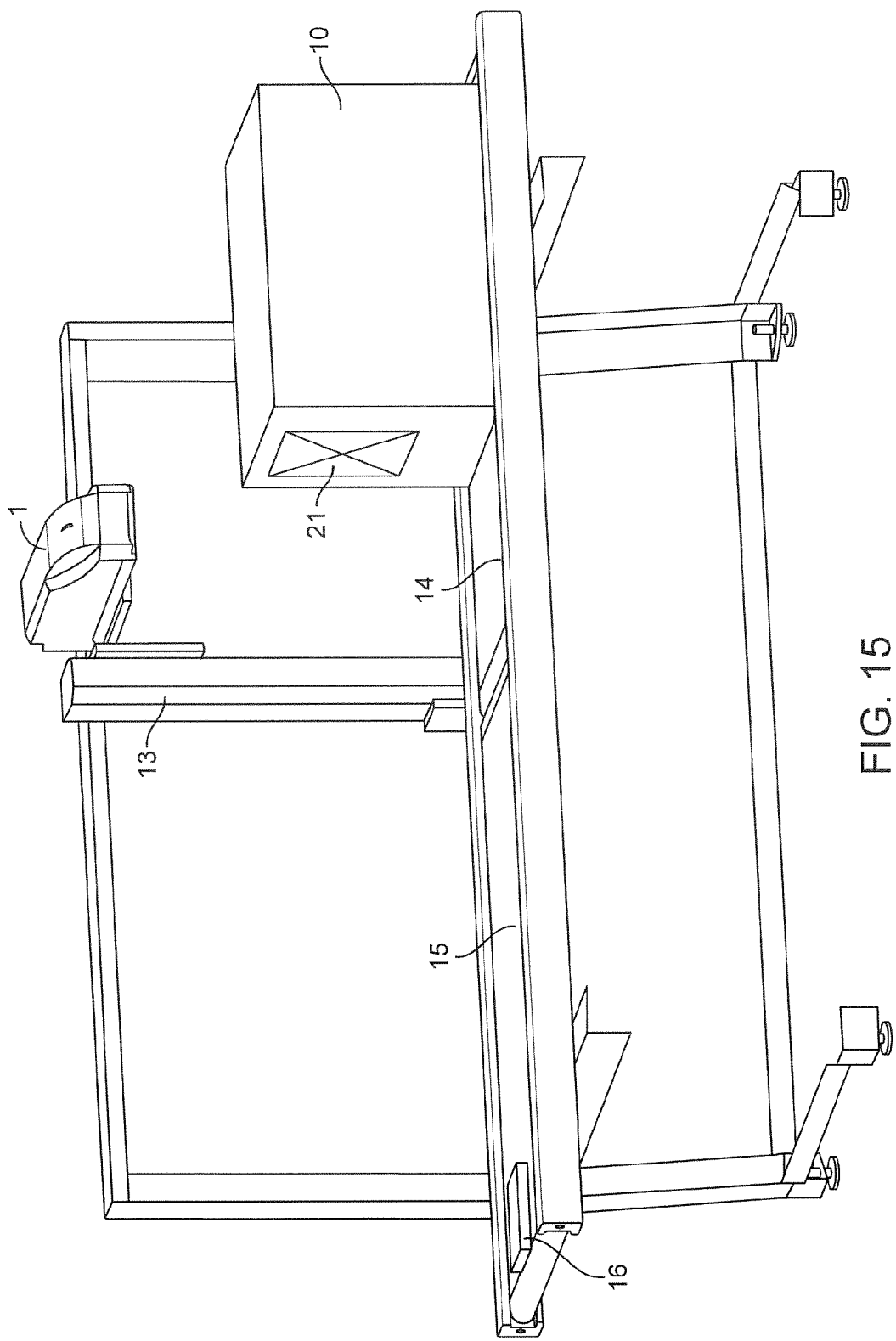

FIG. 15 depicts a box (10) continuing through an exemplary package processor (40) of the present disclosure to allow the cutting/imaging head (1) access to the trailing edge of the box (denoted by aspect 21) for similar processing as was illustrated previously regarding the leading edge.

Figure 16:
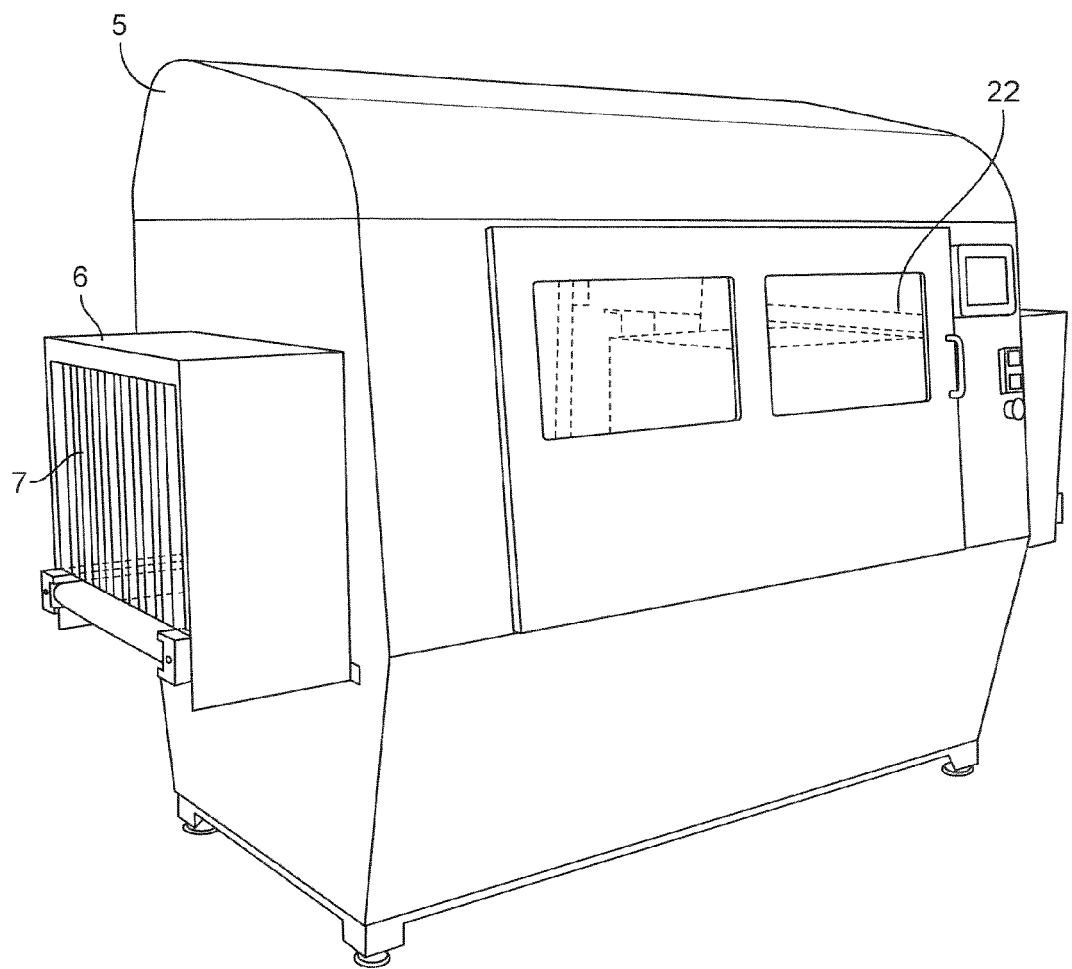
Figure 17:
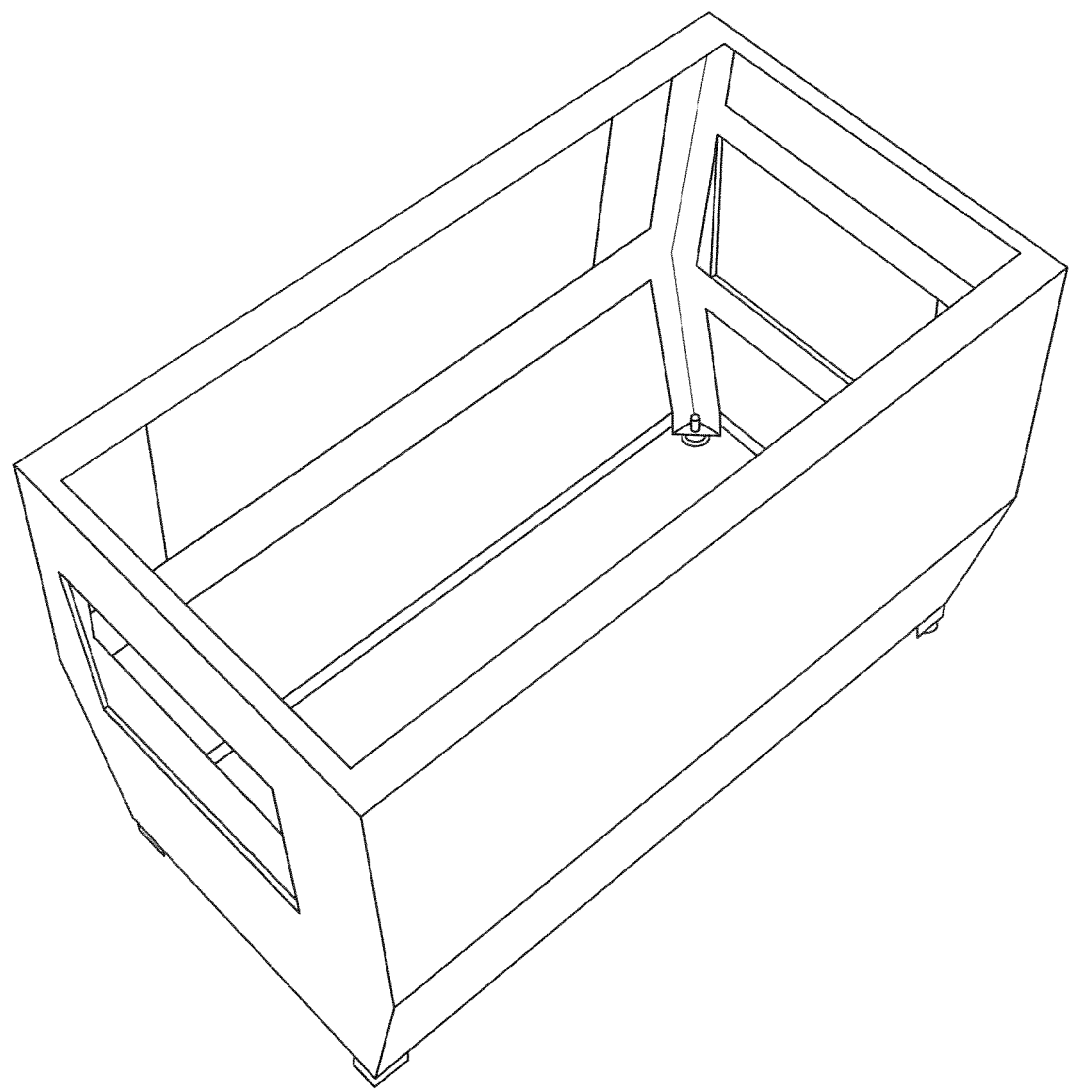

FIGS. 16-17 depict another couple renderings of embodiments of an exemplary package processor (40) of the present disclosure processor.

Figure 18:
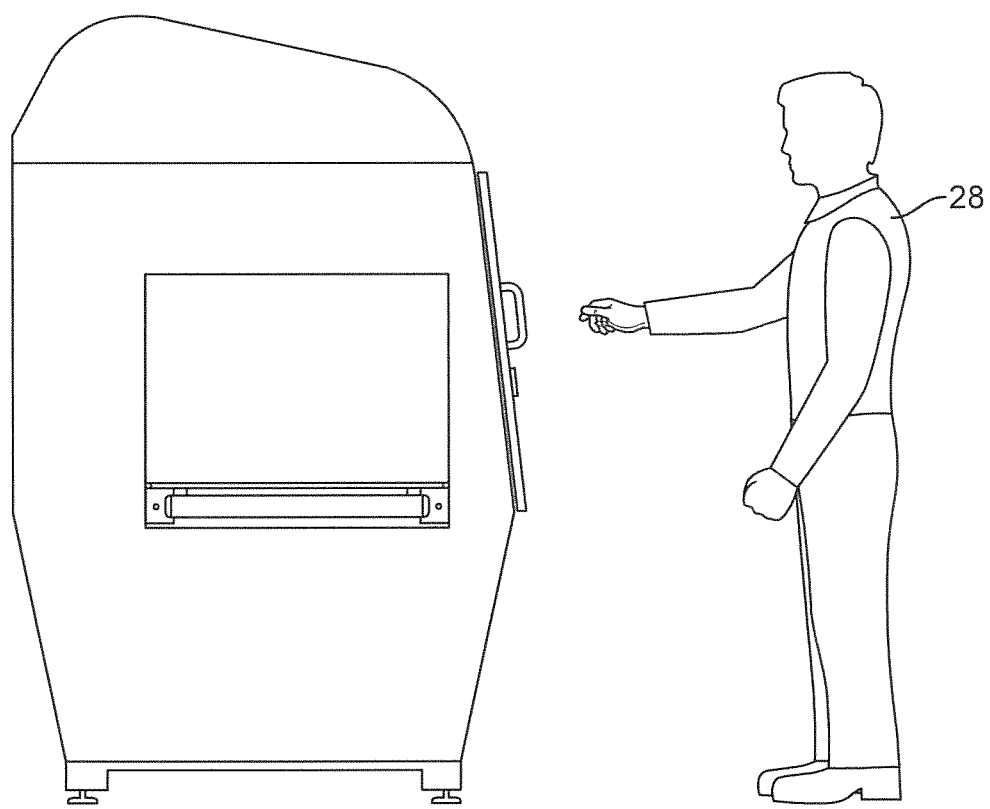

FIG. 18 depicts approximate dimensions of an exemplary package processor (40) of the present disclosure relative to a human operator (28). Other sizes may be implemented to process larger or smaller boxes and still be considered within the spirit and scope of the innovation described herein.

In an exemplary embodiment, once the information from the box is gathered, the box may be reversed back through the system where the cutting head may be utilized to open the box by parting taped or otherwise sealed seams, or by heating surfaces such that temperature sensitive adhesives fail, or by parting the box's base component (e.g., cardboard). To attempt to increase the speed of processing operations, the box may be cut as it reverses through the system as opposed to returning it back to a starting point and starting again. In certain embodiments, this operation is useful, for example, if the box is slowed to cut the leading or trailing edge.

In certain embodiments, as the box exits the imaging phase, it may be stopped and the direction reversed, this may be done, for example, at a speed to accommodate cutting needs. In such an embodiment, then the box may continue through the processor in a reverse direction where the top and sides are processed; finally the box may be slowed and stopped at the starting end while the leading face (now the trailing face due to direction change) is processed. Finally, the box may be accelerated out of the machine.

Often, processing the boxes in the reverse mode noted above can be utilized to eliminate or decrease the need for a decelerate/accelerate cycle. Such an operation may also be useful to perform imaging and cutting operations at the same time so that the box only has to pass through the machine a single time. This operation can be provided in exemplary situations where it is possible to positively identify desired operations quickly and without having to gather all data prior to identification. As an example, a system performing a single operation (e.g., cutting the center seam of the top of a box) may identify the center of the box and utilize the cutting head; almost simultaneously adjusting the cutter focus or power as the camera detects dents, dings, crush points, etc. just ahead of the cutter beam.

One skilled in the art would appreciate that the above operations can be accomplished by advancing the box to a fixed position and moving the imaging/cutting head relative to the box rather than moving the box relative to the cutting head. Further, one skilled in the art would appreciate that operations may be accomplished by a combination of moving the cutting head and the conveyor simultaneously and harmoniously.

In one embodiment, the conveyors may be oriented such that they are not linear, and the box may enter and exit from the same end of the processor, or they may enter and exit in directions which may not be linear as illustrated here in the preferred embodiments.

In certain embodiments, 3D measurements are provided to create a relief map of the top surface (e.g., cutting surface), z-coordinates collected at preselected intervals interspersed between leading edge and trailing edge. Intervals of coordinate collection determine resolution.

In certain embodiments, force imparted onto the box due to clamping or mechanical cutting is reduced or eliminated through the use of photonic beam cutting. In certain embodiments the box can be cut while moving when utilizing the system of the present disclosure.

In certain embodiments, a conveyor is provided having a position encoder that provides position feedback relative to the location of the box in the system.

In certain embodiments the photonic cutting device is a laser. In related embodiments, the photonic cutting device is a $CO_2$ laser. In certain embodiments the laser is manipulated using a galvo head, optionally via a 3-axis galvo head. Often the photonic beam is controllable through manipulating the power source feeding the photonic cutting device or beams emitted therefrom. Also frequently the focal length of the photonic beam is controllable.

In certain embodiments the photonic beam vaporizes packaging material. In related embodiments the system includes air flow and optional filtering to remove or circulate vaporized material residue from the system or cutting zone.

In certain embodiments a parallel beam comprising a low power laser and an interferometer to measure a Z-height of surface to be cut real time is provided.

In certain embodiments the system produces a zig-zag or sinusoidal cut pattern of a box, or a tape seam on a box. In certain embodiments the system is utilized to convert a shipping box into point of sale displays, including predetermined ornamental or intricate cut patterns in the box.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. As automated instrumentation and its use is described herein, requisite user interfaces, component controllers and connections, and electronic monitors of system status, including electronically conducted instructions (including software and firmware) and memory for storing system instructions, statistics, and parameters are contemplated. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for opening packages, comprising:
    a conveyer for supporting or conveying a package, wherein the package comprises a surface material;
    an imaging/cutter head movably positionable about the conveyor, the imaging cutter head comprising:
        a scanner to inspect and measure the packages for a cutting operation to thereby determine a process location comprising a location on the package for introduction of a cut to the surface material; and
        a cutter movably positionable about the process location, the cutter comprising a photonic energy beam source, wherein the photonic energy beam source emits an energy beam directed at the process location, and wherein the energy beam contacts and cuts the surface material in the process location.

2. The system of claim 1, further comprising a beam trap to trap light energy from the energy beam.

3. The system of claim 2, wherein the beam trap comprises an actuated door positioned about the conveyor to receive the packages therethrough.

4. The system of claim 2, wherein the beam trap comprises two actuated doors.

5. The system of claim 4, wherein the two actuated doors are interlocked such that both doors cannot be open concurrently when the system is in use.

6. The system of claim 4, further comprising a 90-degree transfer conveyor.

7. The system of claim 1, wherein the photonic energy beam source is mounted on a gantry.

8. The system of claim 1, wherein the photonic energy beam source is moveable in X-, Y-, and/or Z-directions.

9. The system of claim 1, wherein the photonic energy beam source is omni-directional.

10. The system of claim 1, further comprising a mirror to split the energy beam into multiple beams, each of which is capable of cutting the surface material and is directed at the same or different process location.

11. The system of claim 10, wherein the mirror is not stationary and is to move to re-direct or focus one or more of the multiple beams.

12. The system of claim 1, further comprising a mirror to re-direct or focus the energy beam.

13. The system of claim 12, wherein the mirror is non-stationary.

14. The system of claim 1, wherein the photonic energy beam source is to impart a cut in a portion of the surface material at multiple angles or at different locations of the surface material or the packaging material.

15. The system of claim 1, wherein the photonic energy beam source comprises a laser.

16. The system of claim 1, wherein the package comprises a damaged portion in the surface material, wherein the damaged portion comprises an irregularity not present on an undamaged package of the same type.

17. The system of claim 1, wherein the system is to control the depth of the cut in the surface material using a focal length adjustment, dwell time adjustment, or an interferometer.

18. The system of claim 1, wherein the measurement zone and the cutting zone comprise the same spatial area in the system.

19. The system of claim 1, wherein the system is to inspect or measure the package and/or cut the surface material of the package while the package is in-motion on the conveyor.

20. The system of claim 1, further comprising a feedback encoder or an optical feedback mechanism to provide information about a location of the package on the conveyor.

21. The system of claim 1, wherein the process location is identified or adjusted using a displacement sensor.

22. The system of claim 1, wherein the measurement zone comprises a 3D scanning mechanism.

23. The system of claim 22, wherein the 3D scanning mechanism comprises an X-axis, a Y-Axis, and a Z-axis scanner.

24. The system of claim 22, wherein the 3D scanning mechanism is to provide a three dimensional map of each package, and wherein the process location is determined based on the three dimensional map.

25. The system of claim 1, wherein the measurement zone comprises a 2D scanning mechanism and a 3D scanning mechanism.

26. A system for opening packages supported and conveyed by a conveyor, the packages comprising a surface material, comprising:
a beam trap positioned about the conveyor, the beam trap having doors to receive the packages therethrough;
a scanner positioned within the beam trap to inspect and measure the packages in the beam trap for a cutting operation to thereby determine a process location comprising a location on the package for introduction of a cut to the surface material; and
a cutter movably positionable about the process location, the cutter comprising a photonic energy beam source, wherein the photonic energy beam source emits an energy beam directed at the process location, and wherein the energy beam contacts and cuts the surface material in the process location.

27. A method of opening a package, comprising presenting a package to the system of claim 1, inspecting and measuring the package, and cutting the surface material of the package, thereby opening the package.

28. The method of claim 27, wherein the inspecting and measuring the package, and cutting the package steps are carried out in relation to a first and second package, wherein the first and second packages each comprise different physical dimensions and/or comprising different surface materials.

29. The method of claim 28, wherein there is no human intervention within the system between carrying out the inspecting and measuring step, and cutting step in relation to both of the first and second packages.

30. A method of opening a package, comprising presenting a package to the system of claim 26, inspecting and measuring the package, and cutting the surface material of the package while not restraining or clamping the package, thereby opening the package.

31. The method of claim 30, wherein the surface material of the package is cut while the package is in motion.

32. The method of claim 31, wherein the package is in motion though an action of the conveyor.

33. An automated method of opening a package, comprising:
(a) measuring or inspecting a package comprising a surface material with an imaging/cutter head to thereby determine a process location comprising a location on the package for introducing a cut to the surface material; and
(b) after or concurrent with (a), movably positioning the imaging cutter/head comprising a photonic energy beam source about the process location and directing the photonic energy beam source to emit a photonic energy beam at the processing location and thereby cutting the surface material of the package.

34. The method of claim 33, wherein the (a) and (b) occur automatically without human intervention.

35. The method of claim 33, wherein a depth of the cut is controlled using a focal length adjustment, dwell time adjustment, or using an interferometer.

36. The method of claim 33, wherein the package passes through a beam trap that is to trap light energy from the energy beam inside the system prior to or after (a) or (b).

37. The method of claim 36, wherein the beam trap comprises an actuated door and a conveyor.

38. The method of claim 37, wherein the beam trap comprises two actuated doors and a conveyor.

39. The method of claim 38, wherein the two actuated doors are interlocked such that both doors cannot be open concurrently when the system is in use.

40. The method of claim 38, further comprising a 90-degree transfer conveyor.

41. The method of claim 33, wherein the photonic energy beam is emitted from a photonic energy beam source mounted on a gantry.

42. The method of claim 41, wherein the photonic energy beam source is moveable in X-, Y- and/or Z-directions.

43. The method of claim 41, wherein the photonic energy beam source is to impart a cut in a portion of the surface material at multiple angles or at different locations of the surface material or a packaging material.

44. The method of claim 33, wherein the photonic energy beam is split into multiple beams using a mirror, and wherein each beam is directed at the same or different process location and cuts the surface material at the point of contact.

45. The method of claim 44, wherein the mirror is not stationary and is to move to re-direct or focus one or more of the multiple beams.

46. The method of claim 33, wherein the photonic energy beam contacts a mirror and is re-directed prior to contacting and cutting the surface material.

47. The system of claim 46, wherein the mirror is non-stationary.

48. The method of claim 33, wherein the photonic energy beam comprises a laser beam.

49. The method of claim 33, wherein the package comprises a damaged portion in the surface material, wherein the damaged portion comprises an irregularity not present on an undamaged package of the same type.

50. The method of claim 33, wherein the package is not restrained or clamped within the system when the surface material is cut.

51. The method of claim 50, wherein the package is cut while the package is in-motion relative to the energy beam source.

52. The method of claim 33, wherein the photonic energy beam is emitted from a photonic energy beam source, and wherein the surface material of the package is cut while the package is in-motion relative to the energy beam source.

53. The method of claim 52, wherein the energy beam source is stationary when the surface material of the package is cut.

54. The method of claim 52, wherein the energy beam source is in-motion when the surface material of the package is cut.

55. The method of claim 33, wherein (a) comprises obtaining a 3D scan or map of the package.

56. The method of claim 55, wherein the process location is determined based on the 3D scan or map of the package.

57. The method of claim 33, wherein (a) comprises obtaining a 2D and a 3D scan or map of the package.

58. The method of claim 33, wherein the surface material comprises tape, cardboard, shrink wrapping, and/or stretch wrapping.

59. The method of claim 33, wherein (a) and (b) are carried out in relation to two different packages, each having different physical characteristics and/or surface materials.

60. The method of claim 33, wherein the photonic energy beam vaporizes a portion of the surface material.

61. The method of claim 33, wherein (a) and (b) are carried out on a continuous basis in relation to multiple packages without human intervention.

62. The method of claim 61, wherein two or more of the multiple packages comprise packages having different physical dimensions and/or comprising different surface materials.

* * * * *